(12) United States Patent
Neil et al.

(10) Patent No.: US 10,214,683 B2
(45) Date of Patent: Feb. 26, 2019

(54) SYSTEMS AND METHODS FOR PRODUCING HYDROCARBONS FROM HYDROCARBON BEARING ROCK VIA COMBINED TREATMENT OF THE ROCK AND SUBSEQUENT WATERFLOODING

(71) Applicant: BP Corporation North America Inc., Houston, TX (US)

(72) Inventors: James Neil, Whitstable, IL (US); Spencer Taylor, Camberely (GB); Huang Zeng, Calgary (CA); Allan Peats, Okotoks (CA); Giovanna Boccardo, Houston, TX (US); John V. Bullen, Bracknell (GB); Ian Ralph Collins, Sunbury on Thames (GB); Andrew Rees, Walton-On-Thames (GB)

(73) Assignee: BP Corporation North America Inc, Houston, TX (US)

( * ) Notice: Subject to any disclaimer, the term of this patent is extended or adjusted under 35 U.S.C. 154(b) by 0 days.

(21) Appl. No.: 15/543,527

(22) PCT Filed: Jan. 12, 2016

(86) PCT No.: PCT/US2016/013059
§ 371 (c)(1),
(2) Date: Jul. 13, 2017

(87) PCT Pub. No.: WO2016/115142
PCT Pub. Date: Jul. 21, 2016

(65) Prior Publication Data
US 2018/0002595 A1    Jan. 4, 2018

Related U.S. Application Data

(60) Provisional application No. 62/102,713, filed on Jan. 13, 2015.

(51) Int. Cl.
*E21B 43/24* (2006.01)
*C09K 8/592* (2006.01)
(Continued)

(52) U.S. Cl.
CPC ............... *C09K 8/86* (2013.01); *C09K 8/592* (2013.01); *E21B 43/25* (2013.01); *C09K 2208/10* (2013.01)

(58) Field of Classification Search
CPC ......... E21B 43/24; E21B 36/008; C09K 8/86; C09K 8/592
See application file for complete search history.

(56) References Cited

U.S. PATENT DOCUMENTS

| | | |
|---|---|---|
| 3,407,877 A | 10/1968 | Harvey et al. |
| 3,454,095 A | 7/1969 | Messenger et al. |

(Continued)

FOREIGN PATENT DOCUMENTS

| | | |
|---|---|---|
| AT | 122708 A | 6/1995 |
| AU | 1311899 A | 5/1999 |

(Continued)

OTHER PUBLICATIONS

Dagani, Ron, "Process Aids Enhanced Oil Recovery," Chemical Engineering News, vol. 60, No. 23, p. 38, Jun. 7, 1982 (1 p.).

(Continued)

*Primary Examiner* — Catherine Loikith
(74) *Attorney, Agent, or Firm* — John L. Wood

(57) ABSTRACT

A method for producing hydrocarbons within a reservoir includes (a) injecting an aqueous solution into the reservoir. The aqueous solution includes water and a thermally activated chemical species. The thermally activated chemical species is urea, a urea derivative, or a carbamate. The thermally activated chemical agent is thermally activated at or above a threshold temperature less than 200 C. In (Continued)

addition, the method includes (b) thermally activating the thermally activated chemical species in the aqueous solution during or after (a) at a temperature equal to or greater than the threshold temperature to produce carbon-dioxide and at least one of ammonia, amine, and alkanolamine within the reservoir. Further, the method includes (c) increasing the water wettability of the subterranean formation in response to the thermally activation in (b). Still further, the method includes (d) waterflooding the reservoir with water after (a), (b) and (c).

39 Claims, 8 Drawing Sheets

(51) Int. Cl.
  C09K 8/86 (2006.01)
  E21B 43/25 (2006.01)

(56) References Cited

U.S. PATENT DOCUMENTS

| | | | |
|---|---|---|---|
| 3,500,920 | A | 3/1970 | Raifsnider |
| 3,584,686 | A | 6/1971 | Fulford |
| 3,706,341 | A | 12/1972 | Redford |
| 3,724,552 | A | 4/1973 | Snavely |
| 3,782,472 | A | 1/1974 | Siess |
| 3,929,190 | A | 12/1975 | Chang et al. |
| 3,993,555 | A | 11/1976 | Park et al. |
| 4,043,922 | A | 8/1977 | Palmer et al. |
| 4,071,458 | A | 1/1978 | Allen |
| 4,207,945 | A | 6/1980 | Brown et al. |
| 4,223,731 | A | 9/1980 | Estes |
| 4,271,905 | A | 6/1981 | Redford et al. |
| 4,286,660 | A | 9/1981 | Wagner et al. |
| 4,291,765 | A | 9/1981 | Gilchrist et al. |
| 4,306,981 | A | 12/1981 | Blair, Jr. |
| 4,309,306 | A | 1/1982 | Blair, Jr. |
| 4,316,808 | A | 2/1982 | Blair, Jr. |
| 4,326,968 | A | 4/1982 | Blair, Jr. |
| 4,326,983 | A | 4/1982 | Blair, Jr. |
| 4,326,984 | A | 4/1982 | Blair, Jr. |
| 4,326,985 | A | 4/1982 | Blair, Jr. |
| 4,342,657 | A | 8/1982 | Blair, Jr. |
| 4,372,363 | A | 2/1983 | Ames |
| 4,423,779 | A | 1/1984 | Livingston |
| 4,441,555 | A | 4/1984 | Shu |
| 4,455,255 | A | 6/1984 | Stapp |
| 4,493,370 | A | 1/1985 | Stapp et al. |
| 4,498,540 | A | 2/1985 | Marrocco |
| 4,522,732 | A | 6/1985 | Purcell et al. |
| 4,542,789 | A | 9/1985 | Stapp |
| 4,549,609 | A | 10/1985 | Watkins et al. |
| 4,572,296 | A | 2/1986 | Watkins |
| 4,580,633 | A | 4/1986 | Watkins et al. |
| 4,609,477 | A | 9/1986 | Crema |
| RE32,289 | E | 11/1986 | Stapp |
| 4,634,540 | A | 1/1987 | Ropp |
| 4,643,255 | A | 2/1987 | Sandiford et al. |
| 4,664,194 | A | 5/1987 | Marrocco |
| 4,665,986 | A | 5/1987 | Sandiford |
| 4,665,987 | A | 5/1987 | Sandiford et al. |
| 4,666,957 | A | 5/1987 | Marrocco |
| 4,673,038 | A | 6/1987 | Sandiford et al. |
| 4,683,954 | A | 8/1987 | Walker et al. |
| 4,699,214 | A | 10/1987 | Angstadt |
| 4,719,972 | A | 1/1988 | Hsueh |
| 4,743,385 | A | 5/1988 | Angstadt et al. |
| 4,796,700 | A | 1/1989 | Sandiford et al. |
| 4,819,724 | A | 4/1989 | Bou-Mikael et al. |
| 4,828,032 | A | 5/1989 | Teletzke et al. |
| 4,848,464 | A | 7/1989 | Jennings, Jr. et al. |
| 4,859,717 | A | 8/1989 | Hoskin et al. |
| 4,896,723 | A | 1/1990 | Hoskin et al. |
| 4,899,818 | A | 2/1990 | Jennings, Jr. et al. |
| 4,907,656 | A | 3/1990 | Sanchez et al. |
| 4,913,236 | A | 4/1990 | Reed |
| 4,919,827 | A | 4/1990 | Harms |
| 4,939,203 | A | 7/1990 | Marrocco |
| 4,942,469 | A | 7/1990 | Kanai |
| 4,957,639 | A | 9/1990 | Fox |
| 4,967,837 | A | 11/1990 | Danzik |
| 4,982,789 | A | 1/1991 | Prukop |
| 5,000,262 | A | 3/1991 | Danzik |
| 5,027,898 | A | 7/1991 | Naae |
| 5,036,915 | A | 8/1991 | Wyganowski |
| 5,103,907 | A | 4/1992 | Shu |
| 5,110,487 | A | 5/1992 | Current |
| 5,167,280 | A | 12/1992 | Sanchez et al. |
| 5,199,490 | A | 4/1993 | Surles et al. |
| 5,209,295 | A | 5/1993 | Campos et al. |
| 5,215,146 | A | 6/1993 | Sanchez |
| 5,247,993 | A | 9/1993 | Sarem et al. |
| 5,273,682 | A | 12/1993 | Danzik |
| 5,284,206 | A | 2/1994 | Surles et al. |
| 5,314,615 | A | 5/1994 | Campos et al. |
| 5,333,687 | A | 8/1994 | Osterloh |
| 5,547,022 | A | 8/1996 | Juprasert et al. |
| 5,593,955 | A | 1/1997 | Kissel |
| 5,649,596 | A | 7/1997 | Jones et al. |
| 6,035,936 | A | 3/2000 | Whalen |
| 6,213,213 | B1 | 4/2001 | Van Batenburg et al. |
| 6,305,472 | B2 | 10/2001 | Richardson et al. |
| 7,093,659 | B2 | 8/2006 | Powell et al. |
| 7,186,673 | B2 | 3/2007 | Varadaraj et al. |
| 7,188,676 | B2 | 3/2007 | Qu et al. |
| 7,273,101 | B2 | 9/2007 | Davies |
| 7,279,446 | B2 | 10/2007 | Colaco et al. |
| 7,392,845 | B2 | 7/2008 | Berry et al. |
| 7,455,111 | B2 | 11/2008 | Qu et al. |
| 7,481,273 | B2 | 1/2009 | Javora et al. |
| 7,549,472 | B2 | 6/2009 | Morrow et al. |
| 7,655,603 | B2 | 2/2010 | Crews |
| 7,691,260 | B2 | 4/2010 | Caneba |
| 7,712,533 | B2 | 5/2010 | Qu et al. |
| 7,771,588 | B2 | 8/2010 | Engel et al. |
| 7,882,893 | B2 | 2/2011 | Fraim |
| 7,906,462 | B2 | 3/2011 | Mesher et al. |
| 7,938,183 | B2 | 5/2011 | Hart et al. |
| 7,951,755 | B2 | 5/2011 | Wu et al. |
| 7,989,399 | B2 | 8/2011 | Stoian et al. |
| 8,056,624 | B2 | 11/2011 | Gates et al. |
| 8,188,012 | B2 | 5/2012 | Weerasooriya et al. |
| 8,235,110 | B2 | 8/2012 | Larter et al. |
| 8,261,832 | B2 | 9/2012 | Ryan |
| 8,293,686 | B2 | 10/2012 | Brockhoff |
| 8,338,340 | B2 | 12/2012 | Stoian et al. |
| 2001/0018975 | A1 | 9/2001 | Richardson et al. |
| 2003/0092584 | A1 | 5/2003 | Crews |
| 2004/0007358 | A1 | 1/2004 | Lien |
| 2005/0205259 | A1 | 9/2005 | Powell et al. |
| 2006/0009363 | A1 | 1/2006 | Crews |
| 2006/0042796 | A1 | 3/2006 | Qu et al. |
| 2006/0046939 | A1 | 3/2006 | Mesher |
| 2006/0105919 | A1 | 5/2006 | Colaco et al. |
| 2006/0116296 | A1 | 6/2006 | Kippie et al. |
| 2006/0258541 | A1 | 11/2006 | Crews |
| 2007/0111903 | A1 | 5/2007 | Engel et al. |
| 2007/0135310 | A1 | 6/2007 | Qu et al. |
| 2007/0185219 | A1 | 8/2007 | Argillier et al. |
| 2007/0225174 | A1 | 9/2007 | Berry et al. |
| 2007/0265171 | A1 | 11/2007 | Javora et al. |
| 2008/0196892 | A1 | 8/2008 | Lau |
| 2008/0196893 | A1 | 8/2008 | Berger et al. |
| 2009/0075846 | A1 | 3/2009 | Qu et al. |
| 2009/0078414 | A1 | 3/2009 | Horvath et al. |
| 2009/0114394 | A1 | 5/2009 | Javora et al. |
| 2009/0130732 | A1 | 5/2009 | Fedorak et al. |
| 2009/0159288 | A1 | 6/2009 | Horvath et al. |
| 2009/0218099 | A1 | 9/2009 | Hart et al. |
| 2010/0012331 | A1 | 1/2010 | Larter |
| 2010/0126719 | A1 | 5/2010 | Sanders et al. |
| 2010/0270022 | A1 | 10/2010 | Crews |

(56) References Cited

U.S. PATENT DOCUMENTS

| | | | |
|---|---|---|---|
| 2011/0174488 A1 | 7/2011 | Morris et al. | |
| 2011/0247807 A1 | 10/2011 | Harris et al. | |
| 2012/0080187 A1 | 4/2012 | Stehle et al. | |
| 2012/0227965 A1 | 9/2012 | Fang et al. | |
| 2012/0255729 A1 | 10/2012 | Stehle et al. | |
| 2012/0325481 A1 | 12/2012 | Stehle et al. | |
| 2013/0043024 A1 | 2/2013 | Stehle et al. | |
| 2013/0075100 A1 | 3/2013 | Veldman et al. | |
| 2013/0081808 A1 | 4/2013 | Zeidani et al. | |
| 2013/0091808 A1 | 4/2013 | Andrews | |
| 2013/0140021 A1 | 6/2013 | Kobler | |
| 2013/0140216 A1 | 6/2013 | Wickes et al. | |
| 2013/0157920 A1 | 6/2013 | Sanchez et al. | |
| 2014/0073541 A1 | 3/2014 | Ravikiran et al. | |
| 2014/0262241 A1 | 9/2014 | Rees et al. | |
| 2014/0262242 A1 | 9/2014 | Rees et al. | |
| 2014/0262243 A1* | 9/2014 | Rees | E21B 43/2408 166/250.01 |
| 2016/0010441 A1 | 1/2016 | Stehle | |

FOREIGN PATENT DOCUMENTS

| | | |
|---|---|---|
| AU | 2006/287653 A1 | 3/2007 |
| AU | 2002/302006 B2 | 4/2009 |
| AU | 2006/247376 B2 | 12/2011 |
| BR | 0517841 A | 10/2008 |
| CA | 859506 A | 12/1970 |
| CA | 933343 A1 | 9/1973 |
| CA | 1057648 A1 | 7/1979 |
| CA | 1152851 A1 | 8/1983 |
| CA | 1161630 A1 | 2/1984 |
| CA | 1172159 A1 | 8/1984 |
| CA | 1228227 A1 | 10/1987 |
| CA | 1244584 A1 | 11/1988 |
| CA | 1245388 A1 | 11/1988 |
| CA | 1248341 A1 | 1/1989 |
| CA | 1254337 A1 | 5/1989 |
| CA | 1258734 A1 | 8/1989 |
| CA | 1265325 A1 | 2/1990 |
| CA | 1267747 A1 | 4/1990 |
| CA | 2006785 A1 | 6/1990 |
| CA | 1280885 C | 3/1991 |
| CA | 1282526 C | 4/1991 |
| CA | 1285379 C | 7/1991 |
| CA | 2042450 A1 | 12/1991 |
| CA | 1303285 C | 6/1992 |
| CA | 1313755 C | 2/1993 |
| CA | 1315537 C | 4/1993 |
| CA | 2079945 A1 | 5/1993 |
| CA | 1336128 C | 7/1995 |
| CA | 2309460 A1 | 5/1999 |
| CA | 2411559 A1 | 5/2003 |
| CA | 2518000 A1 | 3/2006 |
| CA | 2621781 A1 | 3/2007 |
| CA | 2628148 A1 | 5/2007 |
| CA | 2323007 C | 8/2007 |
| CA | 2713261 A1 | 9/2009 |
| CA | 2570157 C | 6/2010 |
| CA | 2610766 C | 7/2010 |
| CA | 2587685 C | 10/2012 |
| CA | 2778135 A1 | 11/2012 |
| CA | 2791492 A1 | 3/2013 |
| CN | 85101314 A | 8/1986 |
| CN | 1752173 A | 3/2006 |
| CN | 1313563 C | 5/2007 |
| CN | 101210173 A | 7/2008 |
| CN | 101056959 B | 1/2013 |
| CN | 101210174 B | 4/2013 |
| CN | 103333670 A | 10/2013 |
| DE | 4030014 A1 | 4/1991 |
| DE | 1029149 T1 | 4/2001 |
| DK | 1091086 T3 | 5/2008 |
| EP | 0330379 | 8/1989 |
| EP | 0258968 B1 | 1/1991 |
| EP | 0484061 | 6/1992 |
| EP | 0186663 B1 | 5/1995 |
| EP | 1029149 A1 | 8/2000 |
| EP | 1091086 | 12/2007 |
| EP | 1896549 A1 | 3/2008 |
| EP | 1812528 B1 | 12/2013 |
| FR | 2557198 A1 | 6/1985 |
| GB | 2061315 A | 5/1981 |
| GB | 2145420 A | 3/1985 |
| GB | 2211224 A | 6/1989 |
| GB | 2383597 B | 8/2005 |
| GB | 2445121 A | 6/2008 |
| MX | 2007/005745 A | 7/2007 |
| MX | 2010/008843 A | 9/2010 |
| NO | 161808 B | 6/1989 |
| NO | 161979 B | 7/1989 |
| NO | 162566 B | 10/1989 |
| NO | 162567 B | 10/1989 |
| NO | 175650 B | 8/1994 |
| NO | 178903 B | 3/1996 |
| NO | 20025421 A | 5/2003 |
| NO | 20072600 A | 7/2007 |
| NO | 20076303 A | 2/2008 |
| NO | 20081334 A | 5/2008 |
| NO | 328290 B1 | 1/2010 |
| RU | 2047642 C1 | 11/1995 |
| RU | 2341651 C1 | 12/2008 |
| RU | 2361074 C2 | 10/2009 |
| RU | 2007/145931 A | 1/2010 |
| SU | 1739014 A1 | 6/1992 |
| UA | 23587 U | 5/2007 |
| WO | 86/00330 A1 | 1/1986 |
| WO | 96/35040 A1 | 11/1996 |
| WO | 98/30783 A1 | 7/1998 |
| WO | 99/24693 A1 | 5/1999 |
| WO | 2006/055549 A2 | 5/2006 |
| WO | 2006/124826 A1 | 11/2006 |
| WO | 2007/030435 A1 | 3/2007 |
| WO | 2007/061722 A2 | 5/2007 |
| WO | 2009/042284 A1 | 4/2009 |
| WO | 2009/108423 A1 | 9/2009 |

OTHER PUBLICATIONS

Donaldson, Erle C., "Environmental Aspects of Enhanced Oil Recovery," Energy Sources, vol. 4, No. 3, pp. 213-229, 1979 (17 p.).
Zhang, Xia, et al., "Conformance Control of CSS and Steam Drive Process with a Carbamide Surfactant," Journal of Canadian Petroleum Technology, vol. 48, No. 9, Sep. 2009 (3 p.).
Handy, L.L., et al., "Thermal Stability of Surfactants for Reservoir Application," Society of Petroleum Engineers Journal, pp. 722-730, Oct. 1982 (SPE 7867) (9 p.).
Clark, Peter E., "Discussion of Thermal Stability of Surfactants for Reservoir Application," Society of Petroleum Engineers Journal, pp. 905-909, Dec. 1982 (SPE 11323) (5 p.).
Borchardt, John K., et al., "Foaming Agents for EOR: Correlation of Surfactant Performance Properties with Chemical Structure," Society of Petroleum Engineers, SPE International Symposium on Oilfield Chemistry, San Antonio, Texas, Feb. 4-6, 1987, pp. 395-413 (SPE 16279) (19 p.).
Handy, L.L., et al., "The Use of Chemical Addititives with Steam Injections to Increase Oil Recovery," Annual DOE Symposium on Enhanced Oil Gas Recovery and Improved Drilling Technology, 5th (1979), vol. 2 (16 p.).
Gade, Von B., et al., "Investigations of the Suitability of Surfactants as Additives for Steamflood Applications," Jahrgang, vol. 104, No. 12, Dec. 1988, pp. 508-511 (4 p.).
Elsaghir, Abd Elsattar, et al., "Comparative Investigation of Enhanced Oil Recovery Methods with Special Reference to Hot Water Flooding and Alcohol Slug Injection," Pakistan Journal of Hydrocarbon Research, vol. 2, No. 2 (Jul. 1990) pp. 85-91 (7 p.).
Yang, X.H., et al., "A review on Research and Application of Polymeric Alcohols as Oilfield Chemicals," Oilfield Chemistry, vol. 24, No. 2, pp. 171-174 and 192, Jun. 25, 2007 (5 p.).
Adewusi, V.A., "Alcohol-Caustic Steam Process—An Emerging Technology for Heavy Oil Recovery," Petroleum Science and Technology, vol. 16, Nos. 5-6, pp. 583-596, Jun.-Jul. 1998 (14 p.).

(56) References Cited

OTHER PUBLICATIONS

Qu, Cheng-tun, "Content Analysis of Film Spreading Agents in Micellar Solution," Journal of Xi'an Petroleum Institute, vol. 10, No. 3, Sep. 1995, pp. 8, 62-64 (4 p.).
Farouq Ali, S.M., "Application of Solvent Slugs in Thermal Recovery Operations," Producers Monthly, vol. 29, No. 7, pp. 6-9, Jul. 1965 (4 p.).
Lichtenberger, G.J., "Field Applications of Interwell Tracers for Reservoir Characterization of Enhanced Oil Recovery Pilot Areas," Society of Petroleum Engineers, Production Operations Symposium, Oklahoma City, Oklahoma, Apr. 7-9, 1991, pp. 209-225 (SPE 21652) (17 p.).
Borchardt, John K., Et al., "Olefin Sulfonates for High Temperature Steam Mobility Control: Structure-Property Correlations," Society of Petroleum Engineers, SPE International Symposium on Oilfield Chemistry, Houston, Texas, Feb. 18-21, 1997, pp. 91-102 (SPE 37219) (12 p.).
Castro, Leo U., "Demulsification Treatment and Removal of In-Situ Emulsion in Heavy-Oil Reservoirs," Society of Petroleum Engineers, SPE Western Regional Meeting, Bakersfield, California, Mar. 26-30, 2001 (SPE 68852) (10 p.).
PCT Search Report and Written Opinion dated May 28, 2015.
Koebel, M., et al., "Thermal and hydrolytic decomposition of urea for automotive selective catalytic reduction systems: thermochemical and practical aspects," Ind. Eng. Chem. Res., 42, 2093-2100 (2003).
Yang, Xiaohua, et al., "Study and Application of Polymer Alcohol Chemical Agents Used in Oilfields," Oilfield Chemistry, vol. 24, No. 2, Jun. 25, 2007 (6 p.).
Chengtun, Qu, "Content Analysis of Film Spreading Agents in Micellar Solution," Journal of Xi'an Petroleum Institute, Sep. 1995, vol. 10, Issue No. 3 (3 p.).
Smith, K.T., et al., "Application of an Alternate Stimulation Method for the Ferguson Sandstone in the Powder River Basin," Society of Petroleum Engineers, Rocky Mountain Regional Meeting, Casper, Wyoming, May 21-23, 1984 (SPE 12902) (8 p.).
Adewusi, V.A., "Enhanced Recovery of Bitumen by Steam with Chemical Additives," Energy Sources, vol. 13, No. 2, pp. 121-135, Apr.-Jun. 1991 (15 p.).
Ruzin, L.M., "Experimental Investigation of Thermochemical Reservoir Stimulation," Neftepromyslovoe Delo (Oilfield Engineering), vol. 2, pp. 20-26, Feb. 2005, (7 p.).
Altunina, et al., "Rheokinetic Research in the System: High-Viscosity Oil-Oil-Displacing Solution Generating CO2 and Alkaline Buffer System in Situ," 12th Eage Improved Oil Recovery Europe Symposium, Kazan, Russia, No. 12, vol. 59, pp. 53-58, Sep.-Oct. 2003, (6 p.).
Kuvshinov, V.A., et al., "Physico-Chemical IOR Method for Cyclic Steam Stimulation of High-Viscosity Oil Reservoir," 11th European Symposium on Improved Oil Recovery, Amsterdam, The Netherlands, Jun. 14-12, 2001 (5 p.).
Altunina, L.K., Et al., "Rheokinetic Study of Highly Viscous Oil—Oil-Expelling Compound Generating CO2 and an Alkaline Buffer System," Interval, No. 12 (59) 2003, pp. 53-58 (6 p.).
Office Action dated Nov. 30, 2015, for U.S. Appl. No. 14/209,237 (25 p.).
Office Action dated Nov. 27, 2015, for U.S. Appl. No. 14/209,468 (26 p.).
Fu, Xuebing, "Enhanced Oil Recovery of Viscous Oil by Injection of Water-In-Oil Emulsion Made With Used Engine Oil," Society of Petroleum Engineers, SPE Improved Oil Recovery Symposium, Apr. 24-28, 2010, Tulsa, Oklahoma, (SPE 129902).
Nguyen, Phong, et al., "Pore-Scale Assessment of Nanoparticie-Stabilized CO2 Foam for Enhanced Oil Recovery," ACS Publications—American Chemical Society, Energy Fuels, Sep. 17, 2014.
Ehtesabi, Hamide, e al., "Enhanced Heavy Oil Recovery in Sandstone Cores Using TiO2 Nanofluides," ACS Publications—American Chemical Society, Energy Fuels Dec. 5, 2013, 28, 423-430.
PCT Search Report and Written Opinion dated Apr. 12, 2016.
Bai, Yingrui, et al., "Experimental Study on Elthanolamine/Surfactant Flooding for Enhanced Oil Recovery," dx.doi.org/10.1021/ef402313n/Energy Fuels 2014, 28. 1829-1837 (9 p.).
Shen, De-Huang, PhD Thesis: "Studies on the Mechanisms and Technology of the Profile-Control and Oil-Displacement by Urea in Steam Injection for Shallow-Layer Heavy Oil Reservoir," Chinese Research and Development, published in Chinese but relevant chapters 3 and 6 translated into English; May 2005 (50 p.).
Presentation: "Cenovus Christina Lake In-situ Oil Scheme 2011-2012 Update," ERCB Office, Jun. 20, 2012, www.cenovus.com (321 p.).
Presentation: "Suncor Firebag 2012 ERCB Performance Presentation Commercial Scheme Approval No. 8870," May 15-16, 2012, Suncor Energy (342 p.).

\* cited by examiner

SYSTEMS AND METHODS FOR PRODUCING HYDROCARBONS FROM HYDROCARBON BEARING ROCK VIA COMBINED TREATMENT OF THE ROCK AND SUBSEQUENT WATERFLOODING

CROSS-REFERENCE TO RELATED APPLICATIONS

This application is a 35 U.S.C. § 371 national stage application of No. PCT/US16/13059 filed Jan. 12, 2016 which claims priority to U.S. provisional patent application Ser. No. 62/102,713 filed Jan. 13, 2015, and entitled "SYSTEMS AND METHODS for PRODUCING HYDROCARBONS FROM HYDOCARBON BEARING ROCK VIA COMBINED TREATMENT OF THE ROCK AND SUBSEQUENT WATERFLOODING," both of which are hereby incorporated herein by reference in its entirety.

STATEMENT REGARDING FEDERALLY SPONSORED RESEARCH OR DEVELOPMENT

Not applicable.

FIELD

Embodiments described herein generally relate to methods for recovering hydrocarbons from hydrocarbon bearing rock (e.g., subterranean formations). More particularly, embodiments described herein relate to methods for modifying the wettability of the hydrocarbon bearing rock to enhance recovery of the hydrocarbons during a subsequent waterflood.

BACKGROUND

In many reservoirs, the original oil-in-place (OIP) is recovered in multiple stages. In an initial stage, usually termed "primary" production, the intrinsic reservoir pressure is sufficient to drive the oil from the subterranean reservoir into the production. Usually, only a fraction of the original OIP is produced by this method—often, up to about 20% of the original OIP is produced. The next stage of production, usually termed "secondary" production, relies on alternative production techniques (other than the intrinsic reservoir pressure) to recover more of the original OIP.

Waterflooding is one type of secondary recovery technique that employs a plurality of wells drilled into the reservoir. The wells may include a plurality of horizontally-spaced vertically oriented wells drilled into the reservoir and/or a plurality of horizontally-spaced horizontally oriented wells drilled into the reservoir. Water is injected under pressure into the reservoir through one or more of the wells, each referred to as an "injection" well. The water increases the reservoir pressure, and as the water moves through the formation, it displaces oil from the pore spaces. The displaced oil is pushed or swept through the formation and into one or more of the other wells, each referred to as a "production" well. The hydrocarbons and any water collected in the production wells are produced to the surface via natural flow or artificial lift (i.e., with or without artificial lift). Waterflooding can be used to recover additional oil, often up to an additional 30% of the original OIP. After this point, the cost of continuing a waterflood often becomes uneconomical relative to the value of the oil produced. Hence, as much as 50% of the original OIP can remain in the reservoir after a reservoir has been extensively waterflooded. In general, waterflooding is used as a recovery technique for light oil (32°-40° API gravity), medium oil (20°-32° API gravity), and some viscous oils such as heavy oil (less than 22° API gravity) and bitumen (less than 10° API gravity).

Thermal recovery techniques are particularly suited for recovering viscous oil such as heavy oil and bitumen. These techniques utilize thermal energy to heat the hydrocarbons, decrease the viscosity of the hydrocarbons, and mobilize the hydrocarbons within the formation, thereby enabling the extraction and production of the hydrocarbons. A steam-assisted gravity drainage (SAGD) operation is one exemplary type of thermal technique for recovering viscous hydrocarbons. SAGD operations typically employ two vertically spaced horizontal wells drilled into the reservoir and located close to the bottom of the reservoir. Steam is injected into the reservoir through the upper, horizontal well, referred to as the "injection" well, to form a "steam chamber" that extends into the reservoir around and above the horizontal injection well. Thermal energy from the steam reduces the viscosity of the viscous hydrocarbons in the reservoir, thereby enhancing the mobility of the hydrocarbons and enabling them to flow downward through the formation under the force of gravity. The mobile hydrocarbons drain into the lower, horizontal well, referred to as the "production" well. The hydrocarbons are collected in the production well and are produced to the surface via natural flow or artificial lift (i.e., with or without artificial lift).

Another thermal technique for recovering viscous hydrocarbons is a "hot" waterflooding operation, also referred to as a hot water injection operation. In a conventional or "cold" waterflood, liquid water is injected into the reservoir without increasing its temperature prior to injection, and thus, is typically injected into the reservoir at a temperature that is less than or equal to the ambient temperature of the reservoir, whereas in a "hot" waterflood, the temperature of the liquid water is increased prior to injection, and thus, is typically injected into the reservoir at a temperature that is greater than the ambient temperature of the reservoir (e.g., the water is heated before being injected into the reservoir). The hot water provides the added benefit of adding thermal energy to the reservoir, which decreases the viscosity of the hydrocarbons, thereby allowing the hydrocarbons to move more easily toward production wells. Accordingly, hot waterfloods are commonly used to recover viscous oils, whereas cold waterfloods are commonly used with light and medium oils.

BRIEF SUMMARY OF THE DISCLOSURE

Embodiments of methods for producing hydrocarbons within a reservoir in a subterranean formation are disclosed herein. The reservoir having an ambient temperature and an ambient pressure. In one embodiment, the method comprises (a) injecting an aqueous solution into the reservoir with the reservoir at the ambient temperature. The aqueous solution comprises water and a thermally activated chemical species. The thermally activated chemical species is urea, a urea derivative, or a carbamate. The thermally activated chemical agent is thermally activated at or above a threshold temperature less than 200° C. In addition, the method comprises (b) thermally activating the thermally activated chemical species in the aqueous solution during or after (a) at a temperature equal to or greater than the threshold temperature to produce carbon-dioxide and at least one of ammonia, amine, and alkanolamine within the reservoir. Further, the method comprises (c) increasing the water wettability of the subterranean formation in response to the thermally activation in (b). Still further, the method comprises (d) waterflooding the reservoir with water after (a), (b) and (c).

Embodiments of methods method for recovering hydrocarbons from hydrocarbon bearing rock are disclosed herein. In one embodiment, the method comprises (a) applying an aqueous solution to the rock. The aqueous solution comprises water and a thermally activated chemical species. The thermally activated chemical species is urea, a urea derivative, or a carbamate. The thermally activated chemical agent is thermally activated at or above a threshold temperature less than 200° C. In addition, the method comprises (b) thermally activating the thermally activated chemical species in the aqueous solution during or after (a) at a temperature equal to or greater than the threshold temperature to produce carbon-dioxide and at least one of ammonia, amine, and alkanolamine within the rock. Further, the method comprises (c) increasing the water wettability of the rock in response to the thermally activation in (b). Still further, the method comprises (d) flushing the rock with water after (a), (b), and (c).

Embodiments described herein comprise a combination of features and advantages intended to address various shortcomings associated with certain prior devices, systems, and methods. The foregoing has outlined rather broadly the features and technical advantages of the invention in order that the detailed description of the invention that follows may be better understood. The various characteristics described above, as well as other features, will be readily apparent to those skilled in the art upon reading the following detailed description, and by referring to the accompanying drawings. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
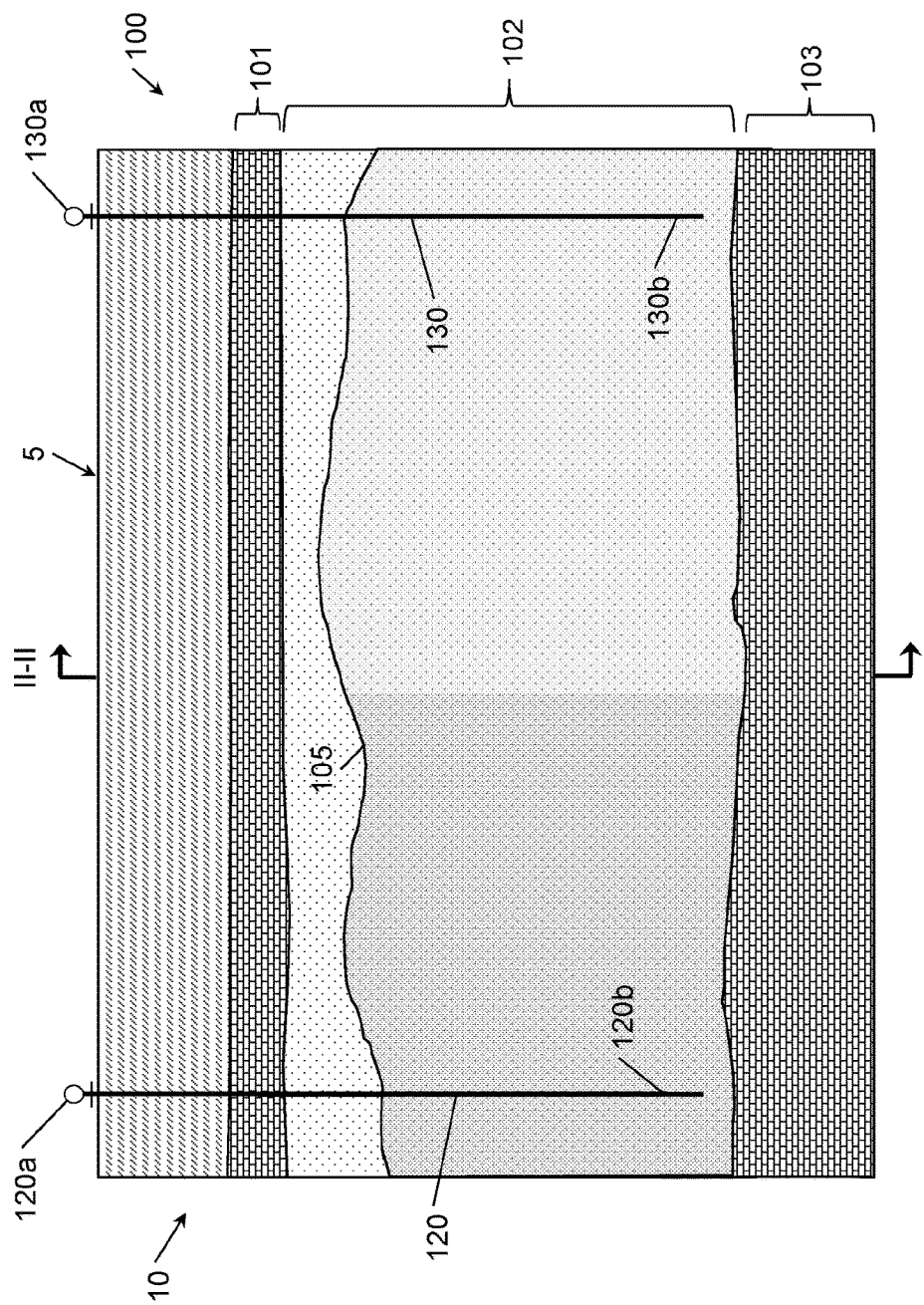
FIG. 1 is a schematic cross-sectional side view of an embodiment of a system in accordance with the principles described herein for producing hydrocarbons from a subterranean formation.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. Any reference to up or down in the description and the claims will be made for purposes of clarity, with "up", "upper", "upwardly" or "upstream" meaning toward the surface of the borehole and with "down", "lower", "downwardly" or "downstream" meaning toward the terminal end of the borehole, regardless of the borehole orientation.

As existing reserves of hydrocarbons (e.g., light crude oil) are depleted and the demand for hydrocarbon products continue to rise, there is a push to develop techniques for maximizing the quantity of the original OIP that is recovered and produced. Waterflooding operations provide one secondary recovery technique for enhancing the percentage of the original OIP that is recovered, up to an additional 30% of the original OIP. In addition, thermal recovery techniques such as SAGD and hot waterflooding provide techniques to enhance recovery of viscous oils such as heavy oil and bitumen. However, such operations alone may result in less than desirable production yields. For example, after cold waterflooding operations, as much as 50% of the original OIP may remain in the reservoir; and after thermally based operations suitable for viscous oil recovery, such as SAGD and hot waterflooding, as much as 40% of the original OIP may remain in the reservoir. However, as will be described in more detail below, embodiments of systems and methods described herein offer the potential to enhance the quantity of the original OIP recovered from the reservoir.

Referring now to FIG. 1, an embodiment of a system 10 for producing hydrocarbons including light oil, medium oil, and viscous oil (e.g., bitumen and heavy oil) from a subterranean formation 100 by loading the reservoir 105 with one or more chemical agent(s), thermally activating the chemical agent(s) in the reservoir 105, and then performing a waterflooding operation is shown. Moving downward from the surface 5, formation 100 includes an upper overburden layer or region 101 of consolidated cap rock, an intermediate layer or region 102 of rock, and a lower underburden layer or region 103 of consolidated rock. Layers 101, 103 are formed of generally impermeable formation material (e.g., limestone). However, layer 102 is formed of a generally porous, permeable formation material (e.g., sandstone), thereby enabling the storage of hydrocarbons therein and allowing the flow and percolation of fluids therethrough. In particular, layer 102 contains a reservoir 105 of hydrocarbons (reservoir 105 shaded in FIG. 1).

System 10 includes an injection well 120 and a production well 130. Each well 120, 130 extends from an uphole end 120a, 130a, respectively, disposed at the surface 5 through overburden layer 101 and the reservoir 105 to a downhole end 120b, 130b, respectively, proximal underburden layer 103. In this embodiment, wells 120, 130 are horizontally-spaced and vertically oriented. The portions of each well 120, 130 extending through layer 102 and reservoir 105 are lined with perforated or slotted liners, and thus, are open to reservoir 105. Although FIG. 1 only illustrates one injection well 120 and one production well 130, system 10 can include a plurality of injection wells 120 and/or a plurality of production wells 130. Further, although the waterflooding wells 120, 130 are vertically oriented in this embodiment, in other embodiments, the waterflooding wells (e.g., wells 120, 130) can be horizontally-spaced and include horizontal sections.

Figure 2:
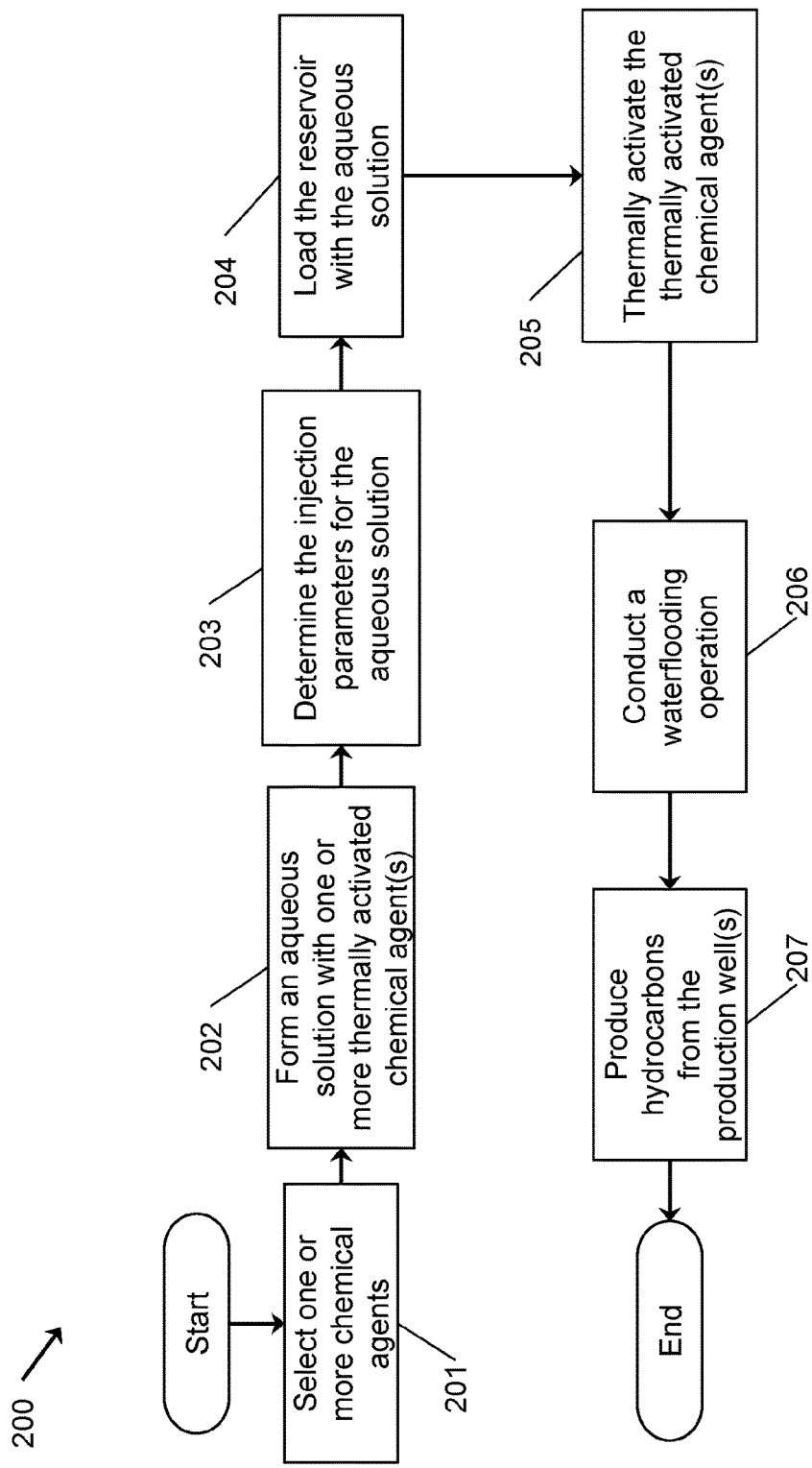
FIG. 2 is a graphical illustration of an embodiment of a method in accordance with the principles described herein for producing viscous hydrocarbons in the reservoir of FIG. 1 using the system of FIG. 1.

Referring now to FIG. 2, an embodiment of a method 200 for producing hydrocarbons from reservoir 105 (or portion of reservoir 105) using system 10 is shown. In this embodiment, and as will described in more detail below, reservoir 105 is loaded with an aqueous solution including one or more chemical agent(s) prior to initiating production operations. The chemical agent(s) are thermally activated within the reservoir 105 to increase the water wettability of the formation 100, which offer the potential to increase the production of hydrocarbons from well 130 in a subsequent waterflooding operation. Since the chemical agent(s) are injected in an aqueous solution, method 200 is particularly suited for use with reservoirs exhibiting a native permeability to water and is generally independent of the native wettability of the reservoir.

Although embodiments of method 200 can be used to produce hydrocarbons having any viscosity under ambient reservoir conditions (ambient reservoir temperature and pressure) including, without limitation, light hydrocarbons, heavy hydrocarbons, bitumen, etc., embodiments of method 200 may provide particular advantages for producing oils having an API gravity less than 30°. In general, viscous hydrocarbons having a viscosity greater than 10,000 cP under ambient reservoir conditions are immobile within the reservoir and typically cannot be produced economically using conventional in-situ recovery methods.

Beginning in block 201 of method 200, one or more chemical agents for injection into reservoir 105 are selected. The purpose of the chemical agent(s) is to increase the water wettability of the formation rock in reservoir 105 in response to thermal energy. Thus, selection of the particular chemical agent(s) is based, at least in part, on its ability to increase the water wettability of the formation 100 upon thermal activation. Without being limited by this or any particular theory, the ability of a chemical agent to increase the wettability of a reservoir (e.g., reservoir 105) is believed to depend on a variety of factors including, without limitation, the degree to which the chemical agent or products thereof can alter the pH of the connate water in the reservoir to a value near the isoelectric point such that polar components adsorbed on rock surfaces can be desorbed more easily, the reactivity of the chemical agent or products thereof with the organic bases or acids on the rock surfaces, whether the chemical agent or products thereof can facilitate the formation of gas bubbles on rock surfaces to facilitate desorption of adsorbed hydrocarbons from the rock surfaces, whether reactivity of the chemical agent or products thereof yield compounds capable of reacting with functional groups on the rock surfaces, etc. Core and/or oil samples from the formation of interest can be tested with various chemical agents to facilitate the selection in block 201. In this embodiment, each selected chemical agent is water soluble such that it can be injected into reservoir 105 in an aqueous solution as will be described in more detail below. In embodiments described herein, each selected chemical agent preferably exhibits a solubility of at least 0.01 g/ml in aqueous solution at 25° C. and 1 atm pressure, and more preferably at least 0.05 g/ml in aqueous solution at 25° C. and 1 atm pressure. The cost and availability of various chemical agent(s) may also impact the selection in block 201.

Although a variety of chemical compounds may be useful as chemical agents, in embodiments described herein, the one or more chemical agent(s) selected in block 201 are water soluble thermally activated chemical species that can be used alone, with one or more other chemical agents or compounds, or combinations thereof. In addition, each thermally activated chemical species selected in block 201 is a chemical species that is non-reactive or substantially non-reactive in reservoir 105, as well as at the surface, below a threshold temperature, but decomposes, dissociates, or reacts at a temperature greater than or equal to the threshold temperature to yield or release one or more compounds that increase the water wettability of the reservoir rock such as: (a) a gas or gases that enhances the water wettability of the reservoir rock (e.g., carbon-dioxide gas, ammonia gas, etc.); (b) an alkaline or acidic compound or compounds, which can react with naturally occurring acids or bases, respectively, in the hydrocarbon reservoir to change the surface charge of the reservoir rock to reduce adsorption of polar compounds (e.g., hydrocarbons, natural or injected surfactants, etc.) and increase the water wettability of the reservoir rock; (c) an alkaline or acidic compound or compounds that can change the electric charge of the formation rock surfaces to increase the water wettability of the reservoir rock; (d) a surfactant or surfactant-like compound; or (e) combinations thereof. Accordingly, the threshold temperature may also be referred to herein as the "activation" or "trigger" temperature. Further, as used herein, the phrases "substantially non-decomposable" and "substantially non-reactive" refer to a chemical species that has a conversion rate (via decomposition, reaction, hydrolysis, dissociation, or combinations thereof) of less than 1 mol % over a 24 hour period in an aqueous solution at ambient reservoir temperatures as prepared according to block 202 described in more detail below, and in the presence of hydrocarbons in a reservoir below the threshold temperature. It should be appreciated that the decomposition, dissociation, or reaction of the thermally activated chemical species at or above the threshold temperature may be directly or indirectly thermally driven.

In embodiments described herein, each thermally activated chemical species selected as a chemical agent in block 201 is urea, a urea derivative, or a carbamate (e.g., ammonium carbamate, amine carbamate, and alkanolamine carbamate). In embodiments described herein, "urea derivatives" include, without limitation, 1-methyl urea, 1-ethyl urea, 1,1-dimethyl urea, 1,3-dimethyl urea, 1,1-diethyl urea, and bi(hydroymethyl) urea. As is known in the art, carbamates are chemical compounds with the formula $R_1R_2NC(O)_2R_3$, where $R_1$, $R_2$, $R_3$ are each independently selected from an alkyl group, alkanol group, phenyl group, benzyl group, hydroxyl, or hydrogen. Carbamates are formed (a) by injecting carbon-dioxide into an aqueous solution of ammonium, amine, or alkanolamine, or (b) by reacting alcohols with urea. The carbamate resulting from the injection of carbon-dioxide into aqueous ammonium is commonly referred to as "ammonium carbamate;" the carbamate resulting from the injection of carbon-dioxide into aqueous amine is commonly referred to as "amine carbamate;" and the carbamate resulting from the injection of carbon-dioxide into aqueous alkanolamine is commonly referred to as "alkanolamine carbamate." For suitable water solubility, in embodiments described herein, any $R_1$, $R_2$, $R_3$ that is any alkyl group or alkanol group is preferably a C1-C2 alkyl group or a C1-C2 alkanol group, respectively.

Urea and urea derivatives are water soluble and generally non-reactive below 80° C., but undergo a hydrolysis reaction in the presence of water at a threshold temperature of about 80° C. to produce carbon-dioxide and ammonia. The carbon-dioxide and ammonia each exist in equilibrium between gaseous and liquid phases—gaseous carbon-dioxide and liquid carbon-dioxide (the carbon-dioxide equilibrium is shifted more towards the gaseous phase), and gaseous ammonia and liquid ammonia. Select carbamates are also water soluble and generally non-reactive below 20-50° C. (may vary for different carbamates), but undergo a hydrolysis reaction in the presence of water at a threshold temperature of about 20-50° C. to produce carbon-dioxide and at least one of ammonia, amine, and alkanolamine depending on the compounds used to synthesize the carbamate. For example, the hydrolysis of ammonium carbamate in the presence of water yields carbon-dioxide and ammonia, the hydrolysis of aqueous amine carbamate in the presence of water yields carbon-dioxide and amine, and the hydrolysis of alkanolamine carbamate in the presence of water yields carbon-dioxide and alkanolamine. In each case, the carbon-dioxide and the ammonia, amine, or alkanolamine (depending on the carbamate) each exist in equilibrium between gaseous and liquid phases—gaseous carbon-dioxide and liquid carbon-dioxide (the carbon-dioxide equilibrium is shifted more towards the gaseous phase), gaseous ammonia and liquid ammonia in aqueous solution (for hydrolysis of ammonium carbamate), gaseous amine and liquid amine in aqueous solution (for hydrolysis of amine carbamate), and gaseous alkanolamine and liquid alkanolamine in aqueous solution (for hydrolysis of alkanolamine carbamate). As will be described in more detail below, the carbon-dioxide, ammonia, amine, and alkanolamine resulting from the hydrolysis reactions described above increase the water wettability of the formation rock in reservoir 105.

Moving now to block 202, the selected chemical agent(s) is/are mixed with a brine (i.e., solution of salt in water) to form an aqueous solution. The brine preferably has a composition (e.g., salt concentration and composition) that does not damage the formation rock in reservoir 105. In general, this can be determined by performing injectivity tests with core samples recovered from reservoir 105 using methods known in the art. The concentration of each chemical agent in the aqueous solution can be varied depending on a variety of factors, but is preferably at least about 0.01 wt % and less than or equal to the solubility limit of the chemical agent in the brine under ambient reservoir conditions (i.e., at the ambient temperature and pressure of reservoir 105). In embodiments described herein, the concentration of each chemical agent (e.g., urea) in the aqueous solution is preferably between 1.0 and 20.0 wt %.

Referring still to FIG. 2, in block 203, the parameters for loading or injecting the reservoir 105 with the aqueous solution comprising the chemical agent(s) are determined. In general, the injection parameters can be determined by any suitable means known in the art such as by performing injectivity tests. The injection parameters include, without limitation, the pressure, the temperature, and the flow rate at which the aqueous solution will be injected into reservoir 105. The injection pressure of the aqueous solution is preferably sufficiently high enough to enable injection into reservoir 105 (i.e., the pressure is greater than to the ambient pressure of reservoir 105), and less than the fracture pressure of overburden 101. In general, injection pressure of the aqueous solution can be above, below, or equal to the fracture pressure of reservoir 105. For producing viscous oil having an API gravity less than 30°, the injection pressure is preferably less than the displacement pressure of the viscous oil to facilitate the delivery of the chemical agent(s) to the formation water. The injection temperature of the aqueous solution is preferably greater than the freezing point of the aqueous solution and less than 40° C., and more preferably greater than the freezing point of the aqueous solution and less than the threshold temperature. It should be appreciated that the ambient temperature at the surface 5 may be greater than the ambient temperature of reservoir 105, and thus, the aqueous solution stored the surface 5 may have a temperature greater than the ambient temperature of reservoir 105 (i.e., the injection temperature of the aqueous solution stored at the surface 5 may be greater than the ambient temperature of reservoir 105). However, as noted above, even in such cases, the injection temperature of the aqueous solution is preferably greater than the freezing point of the aqueous solution and less than 40° C.

Moving now to block 204, reservoir 105 is loaded or injected with the aqueous solution according to the injection parameters determined in block 203. Since the aqueous solution is injected into reservoir 105 with reservoir 105 at its ambient temperature, injection of the aqueous solution according to block 204 may be referred to herein as "cold" loading of reservoir 105. During the cold loading of reservoir 105 in block 204, the aqueous solution can be injected into reservoir 105 utilizing one of wells 120, 130, both wells 120, 130, or combinations thereof over time. The aqueous solution is preferably injected into reservoir 105 via injection well 120 alone, via both wells 120, 130 at the same time, or via both wells 120, 130 at the same time followed by injection via well 120 alone. It should be appreciated that since the aqueous solution is injected into the reservoir 105 in block 204 before the waterflood and associated production in blocks 206, 207, respectively, the aqueous solution can be injected into the reservoir in block 204 through one of the wells 120, 130 while the other well 120, 130 is being formed (e.g., drilled). Then, after formation of the second of the wells 120, 130, the aqueous solution can be injected solely through the first of the wells 120, 130, solely through the second of the wells 120, 130, or simultaneously through both wells 120, 130. In general, the aqueous solution can be injected into the reservoir 105 continuously, intermittently, or pulsed by controllably varying the injection pressure within an acceptable range of pressures as determined in block 203. Pulsing the injection pressure of the aqueous solution offers the potential to enhance distribution of the aqueous solution in reservoir 105 and facilitate dilation of reservoir 105. It should be appreciated that any one or more of these injection options can be performed alone or in combination with other injection options.

In implementations where production well 130 is not employed for injection of the aqueous solution, production well 130 is preferably maintained at a pressure lower than the ambient pressure of reservoir 105 (e.g., with a pump) to create a pressure differential and associated driving force for the migration of fluids (e.g., connate water and/or the injected aqueous solution) into production well 130. Pumping fluids out of production well 130 to maintain the lower pressure also enables chemical analysis and monitoring of the fluids flowing into production well 130 from the surrounding formation 101, which can provide insight as to the migration of the aqueous solution through reservoir 105 and the saturation of reservoir 105 with the aqueous solution.

In general, the volume of aqueous solution and duration of injection in block 204 will depend on a variety of factors including, without limitation, the volume of reservoir 105 to be loaded (i.e., the entire reservoir 105 vs. a portion of reservoir 105), the permeability to water, the water saturation, and the maximum injection pressure.

Figure 3:
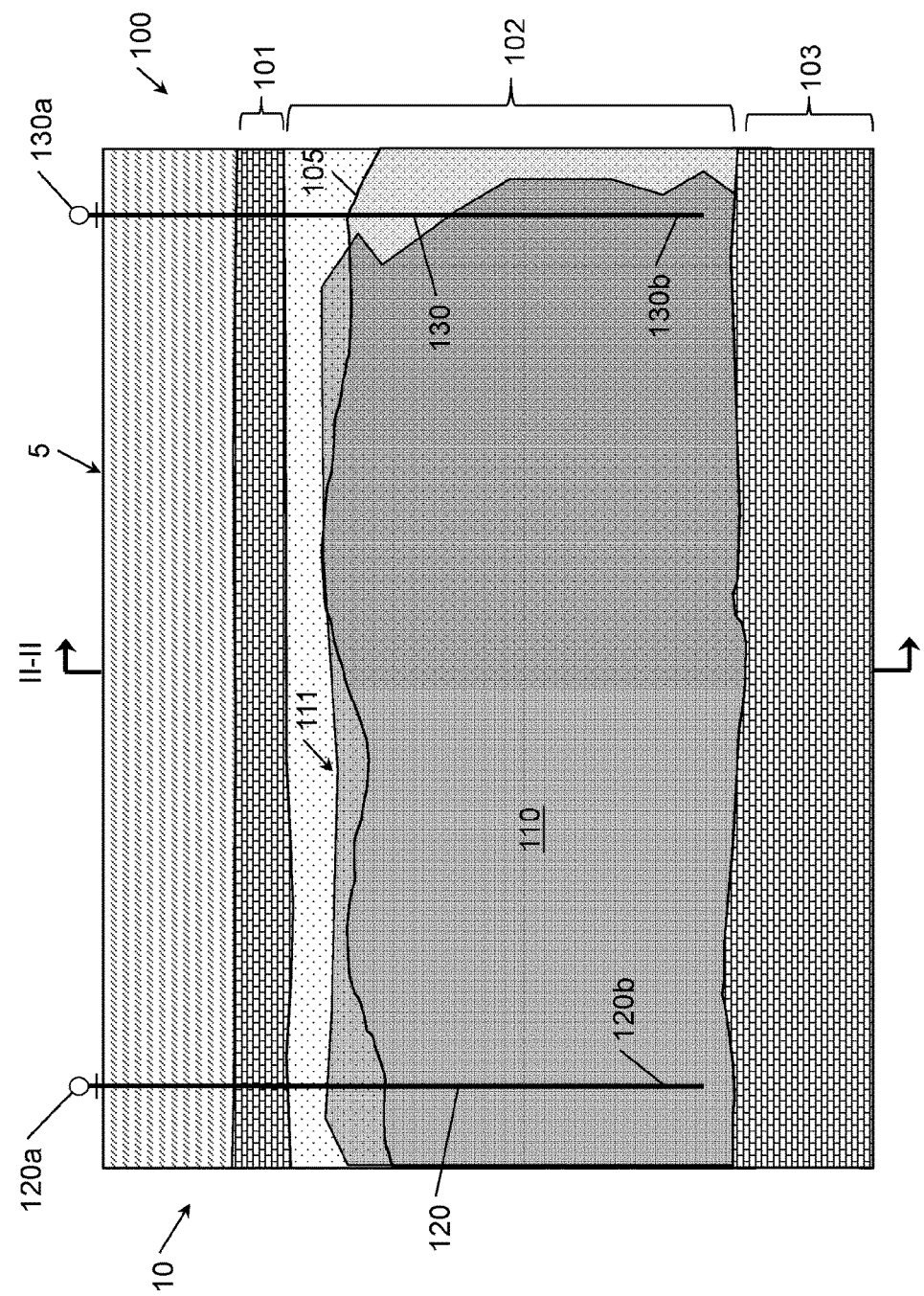
FIG. 3 is a schematic cross-sectional side view of the system of FIG. 1 illustrating a loaded zone formed by injecting the aqueous solution into the reservoir of FIG. 1 according to the method of FIG. 2.

Referring briefly to FIG. 3, reservoir 105 and formation 100 are shown following injection of the aqueous solution according to block 204. In FIG. 3, the aqueous solution is represented with reference numeral "110." The injected aqueous solution 110 forms a loaded zone 111 extending radially outward and longitudinally along the well(s) 120, 130 from which the solution 110 was injected into reservoir 105.

As previously described, the selected chemical agents are thermally activated chemical species that are (1) non-decomposable or substantially non-decomposable and (2) non-reactive or substantially non-reactive in reservoir 105 below the threshold temperature. Thus, if the ambient reservoir temperature is below the threshold temperature, the chemical agent(s) in the aqueous solution do not substantially decompose or react with or otherwise alter the water wettability in reservoir 105 upon injection.

Referring again to FIG. 2, in block 205, after loading the reservoir 105 in block 204, the thermally activated chemical species in the aqueous solution are thermally "activated" or "triggered." In general, the thermally activated chemical species can be thermally activated or triggered by (a) the thermal energy of the reservoir 105 itself if the ambient temperature of the reservoir 105 is at or above the threshold temperature; or (b) thermal energy added to the reservoir 105 if the ambient temperature of the reservoir 105 is below the threshold temperature. Thus, if the ambient temperature of the reservoir 105 is at or above the threshold temperature of the thermally activated chemical species, then the chemical species in the aqueous solution will begin decompose, dissociate, or react upon injection into the reservoir 105 at the ambient temperature of the reservoir 105 to yield or release one or more compounds that increase the water wettability of the reservoir rock as described above. However, if the ambient temperature of the reservoir 105 is not at or above the threshold temperature of the thermally activated chemical species, then thermal energy is added to the reservoir 105 in block 205 to increase the temperature of the reservoir 105 to a temperature equal to or greater than the threshold temperature of the thermally activated chemical species, thereby enabling the thermally activated chemical species in the aqueous solution to decompose, dissociate, or react (at an elevated temperature greater than the ambient temperature of the reservoir 105) to yield or release one or more compounds that increase the water wettability of the reservoir rock as described above.

In general, any suitable means for adding thermal energy to the reservoir 105 can be employed to raise the temperature of the reservoir 105 to or above the threshold temperature of the thermally activated chemical species if the temperature of the reservoir 105 is below the threshold temperature. However, in embodiments described herein, thermal energy is preferably added to the reservoir 105 in block 205 by injecting steam into the reservoir 105 (e.g., a SAGD operation) and/or injecting hot liquid water into the reservoir 105 (e.g., a hot waterflooding operation).

Figure 4:
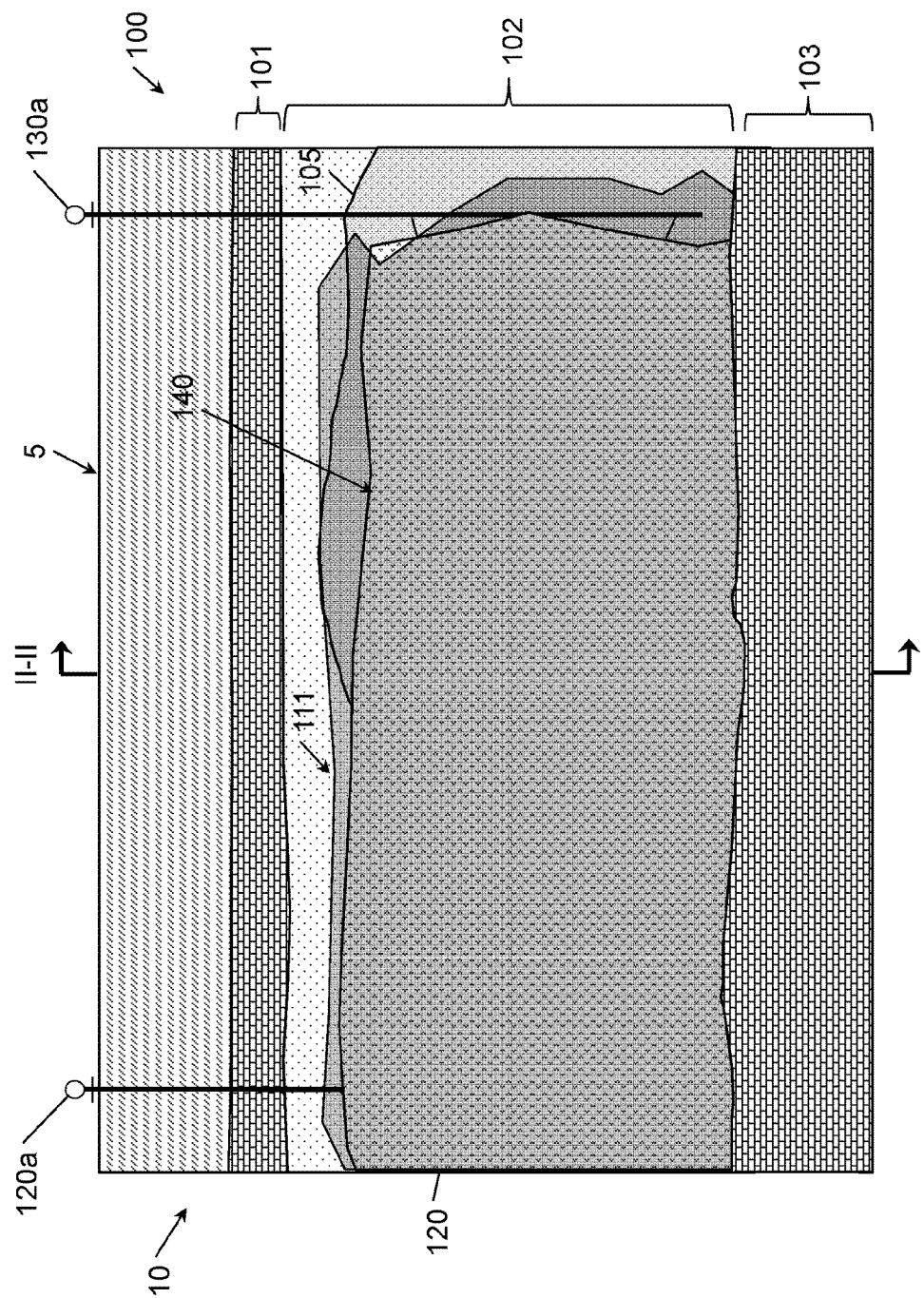
FIG. 4 is a schematic cross-sectional side view of the system of FIG. 1 illustrating a thermal chamber formed by injection of hot water or steam into the reservoir of FIG. 1 to thermally activate the chemical agent(s) in the aqueous solution according to the method of FIG. 2.

Referring briefly to FIG. 4, for both hot waterflooding and steam injection to increase the temperature of the reservoir 105 in block 205, the hot water or steam, respectively, is injected into reservoir 105 via injection well 120. Once injected into reservoir 105, the hot water or steam percolates through the reservoir 105 radially outward and longitudinally along injection well 120, thereby forming a thermal chamber 140. The thermal energy from chamber 140 raises the temperature of reservoir 105 and loaded zone 111 to an elevated temperature that is (i) greater than the ambient temperature of reservoir 105, and (ii) equal to or greater than the threshold temperature of the thermally activated chemical species in the aqueous solution. Once the temperature of the reservoir 105 is at or above the threshold temperature, the thermally activated chemical species in the aqueous solution decompose, dissociate, or react to yield or release the one or more compounds that increase the water wettability of the reservoir rock as described above. It should also be appreciated that the thermal energy from chamber 140 and associated elevated temperature reduces the viscosity of the viscous hydrocarbons in reservoir 105.

As previously described, in this embodiment, the thermally activated chemical species selected in block 201 is (1) urea or a urea derivative, which undergo hydrolysis in aqueous solution upon thermal activation (i.e., at or above 80° C.) to produce carbon-dioxide and ammonia; (2) a carbamate (e.g., ammonium carbamate, amine carbamate, and alkanolamine carbamate), which undergo hydrolysis in aqueous solution upon thermal activation (i.e., at or above 20-50° C.) to produce carbon-dioxide and at least one of ammonia, amine, and alkanolamine; or combinations thereof. The carbon-dioxide gas increases the water wettability of the formation rock in reservoir 105. In addition, the carbon-dioxide gas increases the pressure in the reservoir 105, which offers the potential to enhance mobilization of the hydrocarbons in reservoir 105. The ammonia, amine, and alkanolamine also increases the water wettability of the formation rock in reservoir 105. In addition, the ammonia, amine, and alkanolamine react with organic acid in the hydrocarbons to form surfactants in-situ, which offer the potential to emulsify the hydrocarbons, particularly viscous oil, to form oil-in-water emulsions, thereby reducing the oil viscosity and further increasing the mobilization of the hydrocarbons.

Referring again to FIG. 2, a soaking period can optionally be employed after thermally activating the chemical agent(s) in block 205 and before waterflooding in block 206 to provide ample time for the reaction/decomposition products of the chemical agent(s) to interact with the formation rock and hydrocarbons in the reservoir 105. In embodiments where a soaking period is employed, the soaking period is preferably between 1 and 30 days. In other embodiments, no soaking period is employed, and method 100 proceeds immediately from block 205 to block 206.

Referring still to FIG. 2, after thermally activating the thermally activated chemical species (e.g., urea), a waterflooding operation is performed in block 206. In general, the waterflooding operation in block 206 can be a cold or hot waterflooding operation. In the waterflooding operation according to block 206, water is injected under pressure into the reservoir 105 through injection well 120. The water increases the pressure in reservoir 105, and as the water moves through the reservoir 105, it displaces hydrocarbons from the pore spaces. The hydrocarbon displacement is enhanced in embodiments described herein by the increase in the water wettability of the reservoir 105 resulting from the thermal activation of the thermally activated chemical species. In particular, waterflooding of the treated reservoir 105 in block 206 after treatment of the reservoir 105 in block 205 leads to "beading" and "rolling up" of the hydrocarbons in reservoir 105 that are attached to rock/formation surfaces. The resulting hydrocarbon droplets are more easily pushed or swept by the water through the reservoir 105 and into production well 130. The hydrocarbons and any water collected in production well 130 are produced to the surface via natural flow or artificial lift (i.e., with or without artificial lift) according to block 207.

In general, the waterflood operation in block 206 can be performed using any suitable type of water. In embodiments described herein, the water used for the waterflood operation (e.g., in block 206) preferably has a composition (e.g., salt concentration and composition) that does not damage the formation rock in reservoir 105. In general, this can be determined by performing injectivity tests with core samples recovered from reservoir 105 using methods known in the art. In addition, in embodiments described herein, the water used in the waterflooding operation preferably has its salinity (i.e., dissolved solids and ionic content) tailored and adjusted as described, for example, in U.S. Pat. Nos. 7,987,907 and 8,439,111, each of which is incorporated herein by reference in its entirety. In some embodiments, the water injected to perform the waterflood in block 206 has a total dissolved solids (TDS) greater than 200 ppm and less than 5,000 ppm. In other embodiments, the water used in the waterflooding operation (e.g., in block 206) comprises a brine with a relatively low multivalent cation content and a total dissolved solids (TDS) less than or equal to 50,000 ppm. For example, in some such embodiments, the multivalent cation content is less than 300 ppm, alternatively less than 100, or alternatively less than 50 ppm. It should be appreciated that the water used for the waterflooding can optionally include polymer(s), polymer pre-cursor(s), delayed action polymer(s), or combinations thereof. Further, the waterflood operation in block 206 can optionally be performed by cyclically injecting water followed by gas such as part of a Water Alternated with Gas (WAG) operation.

Figure 5:
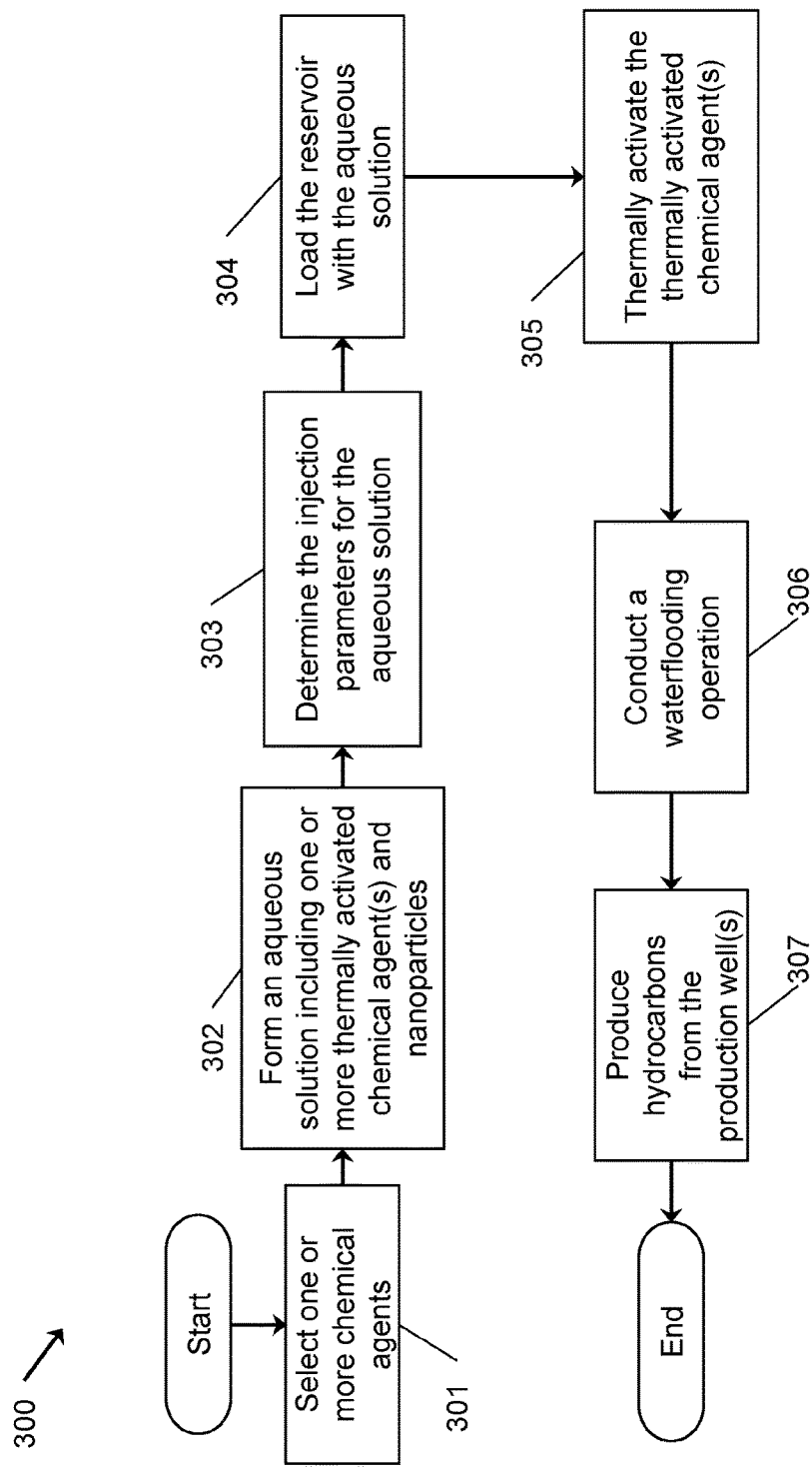
FIG. 5 is a graphical illustration of an embodiment of a method in accordance with the principles described herein for producing viscous hydrocarbons in the reservoir of FIG. 1 using the system of FIG. 1.

Referring now to FIG. 5, an embodiment of another method 300 for producing hydrocarbons from reservoir 105 (or portion of reservoir 105) using system 10 is shown. Method 300 is substantially the same as method 200 previously described with the exception that in this embodiment, reservoir 105 is loaded with an aqueous solution including one or more chemical agent(s) and nanoparticles prior to initiating production operations. The chemical agent(s) are thermally activated within the reservoir 105. The products resulting from the thermal activation of the chemical agents in combination with the nanoparticles increase the water wettability of the formation rock in reservoir 105, form foams in-situ, reduce the viscosity of the hydrocarbons through the formation of oil-in-water emulsions, and increase pressure within the formation, thereby accelerating mobilization and production of hydrocarbons from well 30 in a subsequent waterflooding operation. Since the chemical agent(s) are injected in an aqueous solution, method 300 is particularly suited for use with reservoirs exhibiting a native permeability to water and is generally independent of the native wettability of the reservoir.

Although embodiments of method 300 can be used to produce hydrocarbons having any viscosity under ambient reservoir conditions (ambient reservoir temperature and pressure) including, without limitation, light oil, medium oil, and viscous oil (e.g., heavy oil and bitumen), embodiments of method 300 are particularly suited to producing hydrocarbons having an API gravity less than 30° under ambient reservoir conditions. In general, viscous hydrocarbons having a viscosity greater than 10,000 cP under ambient reservoir conditions are immobile within the reservoir and typically cannot be produced economically using conventional in-situ recovery methods.

Beginning in block 301 of method 300, one or more chemical agents for injection into reservoir 105 are selected. Block 301 is the same as block 201 of method 200 previously described. In particular, the purpose of the chemical agent(s) is to increase the water wettability of the formation rock in reservoir 105 in response to thermal energy. Thus, selection of the particular chemical agent(s) is based, at least in part, on its ability to increase the water wettability of the formation of interest upon thermal activation. As previously described, without being limited by this or any particular theory, the ability of a chemical agent to increase the wettability of a reservoir is believed to depend on a variety of factors including, without limitation, the degree to which the chemical agent or products thereof can alter the pH of the connate water in the reservoir to a value near the isoelectric point such that polar components adsorbed on rock surfaces can be desorbed more easily, the reactivity of the chemical agent or products thereof with the organic bases or acids on the rock surfaces, whether the chemical agent or products thereof can facilitate the formation of gas bubbles on rock surfaces to facilitate desorption of adsorbed hydrocarbons from the rock surfaces, whether reactivity of the chemical agent or products thereof yield compounds capable of reacting with functional groups on the rock surfaces, etc. Core and/or oil samples from the formation of interest can be tested with various chemical agents to facilitate the selection in block 301. In this embodiment, each selected chemical agent is water soluble such that it can be injected into reservoir 105 in an aqueous solution as will be described in more detail below. In embodiments described herein, each selected chemical agent preferably exhibits a solubility of at least 0.01 g/ml in aqueous solution at 25° C. and 1 atm pressure, and more preferably at least 0.05 g/ml in aqueous solution at 25° C. and 1 atm pressure. The cost and availability of various chemical agent(s) may also impact the selection in block 301.

Although a variety of chemical compounds may be useful as chemical agents, in embodiments described herein, the one or more chemical agent(s) selected in block 301 are water soluble thermally activated chemical species that can be used alone, with one or more other chemical agents or compounds, or combinations thereof. In addition, each thermally activated chemical species selected for use as a chemical agent in block 301 is a chemical species that is non-reactive or substantially non-reactive in reservoir 105, as well as at the surface, below a threshold temperature, but decomposes, dissociates, or reacts at a temperature greater than or equal to the threshold temperature to yield or release one or more compounds that increase the water wettability of the reservoir rock such as: (a) a gas or gases that enhances the water wettability of the reservoir rock (e.g., carbon-dioxide gas, ammonia gas, etc.); (b) an alkaline or acidic compound or compounds, which can react with naturally occurring acids or bases, respectively, in the hydrocarbon reservoir to change the surface charge of the reservoir rock to reduce adsorption of polar compounds (e.g., hydrocarbons, natural or injected surfactants, etc.) and increase the water wettability of the reservoir rock; (c) an alkaline or acidic compound or compounds that can change the charge of the formation rock surfaces to increase the water wettability of the reservoir rock; (d) a surfactant or surfactant-like compound; or (e) combinations thereof. Accordingly, the threshold temperature may also be referred to herein as the "activation" or "trigger" temperature. Further, as used herein, the phrases "substantially non-decomposable" and "substantially non-reactive" refer to a chemical species that has a conversion rate (via decomposition, reaction, hydrolysis, dissociation, or combinations thereof) of less than 1 mol % over a 24 hour period in an aqueous solution at ambient reservoir temperatures as prepared according to block 202 described in more detail below, and in the presence of hydrocarbons in a reservoir below the threshold temperature. It should be appreciated that the decomposition, dissociation, or reaction of the thermally activated chemical species at or above the threshold temperature may be directly or indirectly thermally driven.

In embodiments described herein, each thermally activated chemical species selected in block 301 is urea, a urea derivative, is urea, a urea derivative, or a carbamate (e.g., ammonium carbamate, amine carbamate, and alkanolamine carbamate). As previously described, urea and urea derivatives are water soluble and generally non-reactive below 80° C., but undergo a hydrolysis reaction in the presence of water at a threshold temperature of about 80° C. to produce carbon-dioxide and ammonia, each of which exist in equilibrium between gaseous and liquid phases. In addition, as previously described, select carbamates are also water soluble and generally non-reactive below 20-50° C., but undergo a hydrolysis reaction in the presence of water at a threshold temperature of about 20-50° C. to produce carbon-dioxide and at least one of ammonia, amine, and alkanolamine depending on the compounds used to synthesize the carbamate. The carbon-dioxide and the ammonia, amine, or alkanolamine (depending on the carbamate) each exist in equilibrium between gaseous and liquid phases. The carbon-dioxide, ammonia, amine, and alkanolamine resulting from the hydrolysis reactions described above increase the water wettability of the formation rock in reservoir 105.

Moving now to block 302, the selected chemical agent(s) is/are mixed with a brine (i.e., solution of salt in water) to form an aqueous solution. The brine preferably has a composition (e.g., salt concentration and composition) that does not damage the formation rock in reservoir 105. In general, this can be determined by performing injectivity tests with core samples recovered from reservoir 105 using methods known in the art. The concentration of each chemical agent in the aqueous solution can be varied depending on a variety of factors, but is preferably at least about 0.01 wt % and less than or equal to the solubility limit of the chemical agent in the brine under ambient reservoir conditions (i.e., at the ambient temperature and pressure of reservoir 105). In embodiments described herein, the concentration of each chemical agent (e.g., urea) in the aqueous solution is preferably between 1.0 and 20.0 wt %.

Unlike method 200 previously described, in this embodiment, a plurality of nanoparticles are added to the aqueous solution containing the selected chemical agent(s) in block 302. Each of the nanoparticles preferably has a size or diameter between 1.0 nanometer and 1.0 micron, and more preferably between 1.0 nanometers and 100.0 nanometers. In addition, the concentration of the nanoparticles in the aqueous solution is preferably between 10 and 10,000 ppmw. In this embodiment, the nanoparticles added to the aqueous solution in block 302 are preferably made of inorganic or polymeric materials. In general, any suitable type of inorganic or polymeric nanoparticles can be used. Examples of suitable inorganic nanoparticles include, without limitation, metal oxide nanoparticles (e.g., silica, zinc oxide, and the like), carbonate nanoparticles (e.g., calcium carbonate and the like), carbon nanoparticles, titanium oxide nanoparticles, alumina nanoparticles, carbon nanotubes, and nanoparticles comprising functionalized carbon materials (e.g. graphite, graphene, etc.). Examples of polymeric nanoparticles include, without limitation, polystyrene nanoparticles.

In embodiments described herein, each nanoparticle preferably has an outer surface that is partially water-wet and partially oil-wet, and preferably slightly more water-wet than oil-wet. Coatings can be used to achieve the desired degree of water-wettability and oil-wettability of the outer surface (e.g., an outer surface that is 75% water-wet and 25% oil-wet). For example, if the material a given nanoparticle is made of is oil-wet, that nanoparticle can be partially coated with a material that is water-wet such that the outer surface of the nanoparticle is partially oil-wet (i.e., the exposed portion of the nanoparticle is oil-wet) and partially water-wet (i.e., the coated portion of the nanoparticle is water-wet). As noted above the outer surface of each nanoparticle is preferably mixed-wet (i.e., partially water-wet and partially oil-wet), but preferably more water-wet than oil-wet. Thus, for nanoparticles made of oil-wet materials, at least 50% of the total outer surface area of each nanoparticle, and more preferably 50-75% of the total outer surface area of each nanoparticle comprises or is coated with a water-wet material (e.g., hydrophilic coating); and for nanoparticles made of water-wet materials, less than 50% of the total outer surface area of each nanoparticle, and more preferably 25-50% of the total outer surface area of each such nanoparticle comprises or is coated with an oil-wet material (e.g., hydrophobic coating). In general, any suitable water-wet or oil-wet coating can be applied to the nanoparticles. One exemplary coating material is silanes with different functional groups that can react with silica to form hydrophobic coatings. In general, the silica-silane ratio can be controlled to adjust the degree of hydrophobicity of the treated silica. Other possible coating materials include, but are not limited to, long chain amine(s), titanate(s), etc. As will be described in more detail below, nanoparticles having mixed-wet outer surfaces aid in stabilizing gas-in-water foams and oil-in-water emulsions formed in-situ in block 305.

One or more surfactant(s) can optionally be added to the aqueous solution in block 302. The concentration of the surfactant(s) in the aqueous solution is preferably between 10 and 10,000 ppmw. In general, any suitable surfactant(s) can be used. Examples of suitable surfactants include, without limitation to, alkyl sulfonate, alkyl ether sulfate, Triton™ series non-ionic surfactants, and the like. As will be described in more detail below, the surfactant(s) aid in stabilizing gas-in-water foams and oil-in-water emulsions formed in-situ in block 305, as well as reduce the potential for nanoparticles to be retained on the surfaces of formation rock.

Referring still to FIG. 5, in block 303, the parameters for loading or injecting the reservoir 105 with the aqueous solution are determined. The injection parameters are determined in block 303 in the same manner as previously described with respect to block 203 of method 200. The injection pressure of the aqueous solution is preferably sufficiently high enough to enable injection into reservoir 105 (i.e., the pressure is greater than to the ambient pressure of reservoir 105), and less than the fracture pressure of overburden 101. In general, injection pressure of the aqueous solution can be above, below, or equal to the fracture pressure of reservoir 105. For producing viscous oil (e.g., for use in connection with reservoirs containing viscous oil), the injection pressure is preferably less than the displacement pressure of the viscous oil. The injection temperature of the aqueous solution is preferably greater than the freezing point of the aqueous solution and less than 40° C., and more preferably greater than the freezing point of the aqueous solution and less than the threshold temperature. It should be appreciated that the ambient temperature at the surface 5 may be greater than the ambient temperature of reservoir 105, and thus, the aqueous solution stored the surface 5 may have a temperature greater than the ambient temperature of reservoir 105 (i.e., the injection temperature of the aqueous solution stored at the surface 5 may be greater than the ambient temperature of reservoir 105). However, as noted above, even in such cases, the injection temperature of the aqueous solution is preferably greater than the freezing point of the aqueous solution and less than 40° C.

Moving now to block 304, reservoir 105 is loaded or injected with the aqueous solution according to the injection parameters determined in block 303. Since the aqueous solution is injected into reservoir 105 with reservoir 105 at its ambient temperature, injection of the aqueous solution according to block 304 may be referred to herein as "cold" loading of reservoir 105. During the cold loading of reservoir 105 in block 304, the aqueous solution can be injected into reservoir 105 utilizing one well 120, 130, both wells 120, 130, or combinations thereof over time. The aqueous solution is preferably injected into reservoir 105 via injection well 120 alone, via both wells 120, 130 at the same time, or via both wells 120, 130 at the same time followed by injection well 120 alone. It should be appreciated that since the aqueous solution is injected into the reservoir 105 in block 304 before the waterflood and associated production in blocks 306, 307, respectively, the aqueous solution can be injected into the reservoir in block 304 through one of the wells 120, 130 while the other well 120, 130 is being formed (e.g., drilled). Following the formation of the second well 120, 130, the aqueous solution can be injected solely through the first well 120, 130, solely through the second well 120, 130, or simultaneously through both wells 120, 130. In general, the aqueous solution can be injected into the reservoir 105 continuously, intermittently, or pulsed by controllably varying the injection pressure within an acceptable range of pressures as determined in block 303. Pulsing the injection pressure of the aqueous solution offers the potential to enhance distribution of the aqueous solution in reservoir 105 and facilitate dilation of reservoir 105. It should be appreciated that any one or more of these injection options can be performed alone or in combination with other injection options.

In implementations where production well 130 is not employed for injection of the aqueous solution, production well 130 is preferably maintained at a pressure lower than the ambient pressure of reservoir 105 (e.g., with a pump) to create a pressure differential and associated driving force for the migration of fluids (e.g., connate water and/or the injected aqueous solution) into production well 130. Pumping fluids out of production well 130 to maintain the lower pressure also enables chemical analysis and monitoring of the fluids flowing into production well 130 from the surrounding formation 101, which can provide insight as to the migration of the aqueous solution through reservoir 105 and the saturation of reservoir 105 with the aqueous solution.

Injection of the aqueous solution in block 304 is performed until reservoir 105 (or portion of reservoir 105 to be loaded) is sufficiently charged. Ideally, the aqueous solution is injected into reservoir 105 until the total pore volume in reservoir 105 (or portion of reservoir 105 to be loaded) available for water is filled with the aqueous solution. However, practically, this may be extremely difficult, costly, and/or time consuming to achieve owing to the very large volume, the displacement efficiency, and/or the sweep efficiency, for example. Accordingly, in embodiments described herein, the volume of aqueous solution injected into reservoir 105 in block 304 is preferably at least equal to the pore volume of connate water in reservoir 105 (or portion of reservoir 105 to be loaded). The pore volume of connate water in a reservoir (or portion of a reservoir to be loaded) can be calculated using techniques known in the art. In general, the duration of injection in block 304 will depend on the volume of reservoir 105 to be loaded (i.e., the entire reservoir 105 vs. a portion of reservoir 105), the permeability to water, the water saturation, and the maximum injection pressure.

Following injection of the aqueous solution into reservoir 105 in block 304, the aqueous solution forms a loaded zone extending radially outward and longitudinally along the well(s) 120, 130 from which the aqueous solution was injected into reservoir 105 in the same manner as loaded zone 111 previously described and shown in FIG. 3. The loaded zone defines the volume of reservoir 105 that has had its connate water replaced (or at least partially replaced) with the aqueous solution. As previously described, the selected chemical agents are thermally activated chemical species that are (1) non-decomposable or substantially non-decomposable and (2) non-reactive or substantially non-reactive in reservoir 105 below the threshold temperature. Thus, if the ambient reservoir temperature is below the threshold temperature, the chemical agent(s) in the aqueous solution do not substantially decompose, dissociate, or react with or otherwise alter the viscous hydrocarbons in reservoir 105 upon injection.

Referring again to FIG. 5, in block 305, after cold loading the reservoir 105 in block 304, the thermally activated chemical species in the aqueous solution are thermally "activated" or "triggered." In general, the thermally activated chemical species can be thermally activated or triggered by (a) the thermal energy of the reservoir 105 itself if the ambient temperature of the reservoir 105 is at or above the threshold temperature; or (b) thermal energy added to the reservoir 105 if the ambient temperature of the reservoir 105 is below the threshold temperature. Thus, if the ambient temperature of the reservoir 105 is at or above the threshold temperature of the thermally activated chemical species, then the chemical species in the aqueous solution will begin to decompose, dissociate, or react at the ambient temperature of the reservoir 105 to yield or release one or more compounds that increase the water wettability of the reservoir rock as described above. However, if the ambient temperature of the reservoir 105 is not at or above the threshold temperature of the thermally activated chemical species, then thermal energy is added to the reservoir 105 in block 305 to a temperature equal to or greater than the threshold temperature of the thermally activated chemical species, thereby enabling the thermally activated chemical species in the aqueous solution to decompose, dissociate, or react (at an elevated temperature greater than the ambient temperature of the reservoir 105) to yield or release one or more compounds that increase the water wettability of the reservoir rock as described above.

In general, any suitable means for adding thermal energy to the reservoir 105 can be employed to raise the temperature of the reservoir 105 to or above the threshold temperature of the thermally activated chemical species. However, in embodiments described herein, thermal energy is preferably added to the reservoir 105 in block 305 by injecting steam into the reservoir 105 (e.g., a SAGD operation) and/or injecting hot liquid water into the reservoir 105 (e.g., a hot waterflooding operation).

For both hot waterflooding and steam injection to increase the temperature of the reservoir 105 in block 305, the hot water or steam, respectively, are injected into reservoir 105 via injection well 120. Once injected into reservoir 105, the hot water or steam percolates through the reservoir 105 radially outward and longitudinally along injection well 120, thereby forming a thermal chamber such as thermal chamber 140 shown in FIG. 4. The thermal energy from the thermal chamber raises the temperature of reservoir 105 and the loaded zone to an elevated temperature that is (i) greater than the ambient temperature of reservoir 105, and (ii) equal to or greater than the threshold temperature of the thermally activated chemical species in the aqueous solution. Once the temperature of the reservoir 105 is at or above the threshold temperature, the thermally activated chemical species in the aqueous solution decomposes, dissociates, or reacts to yield or release the one or more compounds that increase the water wettability of the reservoir rock as described above. It should also be appreciated that the thermal energy from thermal chamber and associated elevated temperature reduces the viscosity of the viscous hydrocarbons in reservoir 105.

As previously described, in this embodiment, the thermally activated chemical species selected in block 301 is (1) urea or a urea derivative, which undergo hydrolysis in aqueous solution upon thermal activation (i.e., at or above 80° C.) to produce carbon-dioxide and ammonia; or (2) a carbamate (e.g., ammonium carbamate, amine carbamate, and alkanolamine carbamate), which undergo hydrolysis in aqueous solution upon thermal activation (i.e., at or above 20-50° C.) to produce carbon-dioxide and at least one of ammonia, amine, and alkanolamine. The carbon-dioxide gas increases the water wettability of the formation rock in reservoir 105. In addition, the carbon-dioxide gas increases the pressure in the reservoir 105, which offers the potential to enhance mobilization of the hydrocarbons in reservoir 105. The ammonia, amine, and alkanolamine also increases the water wettability of the formation rock in reservoir 105. In addition, the ammonia, amine, and alkanolamine react with organic acid in the hydrocarbons to form surfactants in-situ, which offer the potential to emulsify the hydrocarbons, particularly viscous oil, to form oil-in-water emulsions, thereby reducing the oil viscosity and further increasing the mobilization of the hydrocarbons.

In methods 200, 300, the carbon-dioxide gas, as well as the ammonia gas, amine gas, and alkanolamine gas, disperse in the aqueous solution to form foams. Since the foams comprise gas dispersed in the aqueous solution, it is also referred to herein as "gas-in-water" foam. Thus, methods 200, 300 result in the formation of gas-in-water foams within the reservoir 105 (i.e., in-situ), as distinguished from the formation of gas-in-water foam outside of the reservoir, which are subsequent injected into the reservoir. In method 200, there is nothing to stabilize the gas-in-water foams, and thus, the foams are generally unstable and quickly collapse. However, in method 300, the mixed-wet nanoparticles stabilize the gas-in-water foams within the reservoir 105. In particular, the mixed-wet nanoparticles arrange themselves at the interface between each gas pocket and the surrounding water—at the gas-water interfaces, the water-wet portion of the outer surface of each nanoparticle positions itself within the water and the oil-wet portion of the outer surface of each nanoparticle positions itself outside the water within the gas. Thus, each gas pocket is essentially surrounded and encapsulated within a plurality of the mixed-wet nanoparticles—the mixed-wet outer surfaces of the nanoparticles facilitates the positioning of the nanoparticles at the gas-water interfaces.

In method 300, the mixed-wet nanoparticles also stabilize the oil-in-water emulsions (i.e., hydrocarbons-in-aqueous solution emulsions) resulting from the activation of the thermally activated chemical species. In particular, the mixed-wet nanoparticles arrange themselves at the interface between each oil droplet and the surrounding water—at the oil-water interfaces, the water-wet portion of the outer surface of each nanoparticle positions itself within the water and the oil-wet portion of the outer surface of each nanoparticle positions itself within the oil. Thus, each oil droplet is essentially surrounded and encapsulated within a plurality of the mixed-wet nanoparticles—the mixed-wet outer surfaces of the nanoparticles facilitates the positioning of the nanoparticles at the oil-water interfaces.

As previously described, one or more surfactant(s) can optionally be included in the aqueous solution formed in block 302 and injected into the reservoir 105 in block 304. In embodiments that include surfactant(s) in the aqueous solution, the surfactant(s) stabilize the gas-in-water foams and the oil-in-water emulsions. In addition, the surfactant(s) function to reduce the undesirable retention of nanoparticles on the surfaces of the surfaces of formation rock. In particular, the nanoparticles may be attracted to the formation rocks due to electrostatic attraction (e.g., charged nanoparticles may be attracted to the surfaces of oppositely charged formation rocks). However, any nanoparticles retained on or adhered to the surfaces of the formation rocks are generally unavailable to stabilize the gas-in-water foams and oil-in-water emulsions. Consequently, retention of nanoparticles on the surfaces of formation rock is generally undesirable. However, surfactant(s) included in the aqueous solution at least partially coat the formation rock surfaces, thereby reducing and/or preventing the adherence of the nanoparticles on the surfaces of the formation rocks. Surfactant(s) functioning to coat the formation rock surfaces are generally sacrificial since they are no longer available to help stabilize the gas-in-water foams and the oil-in-water emulsions. Accordingly, lower cost surfactant(s) may be preferred.

Referring again to FIG. 5, a soaking period can optionally be employed after thermally activating the chemical agent(s) in block 305 and before waterflooding in block 306 to provide ample time for the reaction/decomposition products of the chemical agent(s) to interact with the formation rock and hydrocarbons in the reservoir 105. In embodiments where a soaking period is employed, the soaking period is preferably between 1 and 30 days. In other embodiments, no soaking period is employed, and method 300 proceeds immediately from block 306 to block 306.

Referring still to FIG. 5, after thermally activating the thermally activated chemical species, a waterflooding operation is performed in block 306. The waterflooding operation in block 306 is the same as the waterflooding operation in block 206 of method 200 previously described. Namely, the waterflooding operation in block 306 can be a cold or hot waterflooding operation. In addition, the water is injected under pressure into the reservoir 105 through injection well 120. The water increases the pressure in reservoir 105, and as the water moves through the reservoir 105, it displaces hydrocarbons from the pore spaces. The hydrocarbon displacement is enhanced in embodiments described herein by the increase in the water wettability of the reservoir 105 resulting from the thermal activation of the thermally activated chemical species. In particular, waterflooding of the treated reservoir 105 in block 306 after treatment of the reservoir 105 in block 305 leads to "beading" and "rolling up" of the hydrocarbons in reservoir 105 that are attached to rock/formation surfaces. The resulting hydrocarbon droplets are more easily pushed or swept by the water through the reservoir 105 and into production well 130. The hydrocarbons and any water collected in production well 130 are produced to the surface via natural flow or artificial lift (i.e., with or without artificial lift) according to block 307.

In general, the waterflood operation in block 206 can be performed using any suitable type of water. In embodiments described herein, the water used for the waterflood operation (e.g., in block 206) preferably has a composition (e.g., salt concentration and composition) that does not damage the formation rock in reservoir 105. In general, this can be determined by performing injectivity tests with core samples recovered from reservoir 105 using methods known in the art. In addition, in embodiments described herein, the water used in the waterflooding operation preferably has its salinity (i.e., dissolved solids and ionic content) tailored and adjusted as described, for example, in U.S. Pat. Nos. 7,987,907 and 8,439,111, each of which is incorporated herein by reference in its entirety. In some embodiments, the water injected to perform the waterflood in block 306 has a total dissolved solids (TDS) greater than 200 ppm and less than 5,000 ppm. In other embodiments, the water used in the waterflooding operation (e.g., in block 206) comprises a brine with a relatively low multivalent cation content and a total dissolved solids (TDS) less than or equal to 50,000 ppm. For example, in some such embodiments, the multivalent cation content is less than 300 ppm, alternatively less than 100, or alternatively less than 50 ppm. It should be appreciated that the water used for the waterflooding can optionally include polymer(s), polymer pre-cursor(s), delayed action polymer(s), or combinations thereof. Further, the waterflood operation in block 206 can optionally be performed by cyclically injecting water followed by gas such as part of a Water Alternated with Gas (WAG) operation.

The gas-in-water foams stabilized by the nanoparticles in embodiments of method 300 offer the potential to enhance production. In particular, during conventional waterflooding operations, water channels can form in the reservoir between the injection and production well. These water channels define preferential paths for the injected water to flow through the reservoir from the injection well to the production well. The hydrocarbons disposed within the water channels are swept and carried to the production well, however, hydrocarbons outside the water channels are generally left behind in the formation. Since such water channels and associated preferential paths decrease the volume of the reservoir swept by the injected water, they undesirably result in reduced production. However, in embodiments of method 300 described herein, the gas-in-water foams stabilized by the nanoparticles have viscosities greater than the viscosity of the injection water and fill water channels in the reservoir. Consequently, the gas-in-water foams force at least some of the injected water outside of the water channels, thereby effectively increasing the volume of the reservoir 105 swept by the waterflooding operation, which offers the potential for increased production in block 307.

The oil-in-water emulsions stabilized by the nanoparticles in embodiments of method 300 also offer the potential to enhance production. In particular, the oil-in-water emulsions decrease the viscosity of the hydrocarbons in the reservoir, thereby enhancing mobilization of the hydrocarbons during the waterflooding operation in block 306.

In the manner described, embodiments described herein (e.g., system 10 and methods 200, 300) can be employed to produce hydrocarbons, including light oil, medium oil, and viscous oil (e.g., bitumen and heavy oil) in a subterranean reservoir. Although such embodiments can be used to recover and produce hydrocarbons having any viscosity under ambient reservoir conditions, it is particularly suited for the recovery and production of viscous hydrocarbons having an API gravity less than 30° under ambient reservoir conditions.

In FIGS. 2 and 5, blocks 201-207 and 301-307, respectively, are shown as being performed once. However, blocks 204-207 and 304-307 of methods 200, 300, respectively, (i.e., loading the reservoir 105, thermally activating the chemical agent(s), conducting a waterflooding operation, and producing hydrocarbons) can be repeated in a cyclical fashion to further enhance production and the ultimate quantity of hydrocarbons recovered. In addition, any one or more of blocks 201-207 and 301-307 can be performed more than once to enhance hydrocarbon production. For example, during blocks 306, 307 of method 300, water channels defining preferential paths for the water injected during block 306 may form, potentially reducing hydrocarbon production. The gas-in-water foams stabilized by the nanoparticles in method 300 force at least some of the injected water outside of the water channels to increase the volume of the reservoir 105 swept by the waterflooding operation, thereby offering the potential to increase production in block 307. To continue and/or increase the in-situ formation of gas-in-water foams to maintain and/or increase the volume of the reservoir 105 swept by the waterflooding operation, block 304, 305 can be repeated in parallel with blocks 306, 307 (i.e., repeat blocks 304, 305 simultaneous with performance of blocks 306, 307), or alternatively, blocks 304-307 can be repeated in series (i.e., repeat blocks 304-307 one after the other as shown in FIG. 5).

In embodiments of methods 200, 300 shown in FIGS. 2 and 5, respectively, the reservoir 105 is treated with the aqueous solution in blocks 204, 205 and blocks 304, 305, respectively, prior to conducting the waterflooding operation in block 206, 306, respectively. However, in other embodiments, the reservoir (e.g., reservoir 105) is treated (i.e., the reservoir is cold loaded with the aqueous solution and the thermally activated chemical species is thermally activated) after one or more waterflooding operation(s). In such embodiments, treatment of the reservoir following a waterflooding operation offers the potential to at least partially close and reduce water channels formed in the reservoir during the previous waterflooding operation. For example, in one embodiment, a previously waterflooded reservoir is treated with an aqueous solution including one or more thermally activated chemical agents and nanoparticles (optionally with surfactant(s)) as described herein with respect to method 300. Next, the thermally activated chemical agents are thermally activated by (a) the thermal energy of the reservoir itself if the ambient temperature of the reservoir is at or above the threshold temperature; or (b) thermal energy added to the reservoir 105 if the ambient temperature of the reservoir 105 is below the threshold temperature.

In embodiments where the thermally activated chemical species is urea, a urea derivative, or carbamate, the carbon-dioxide gas resulting from the thermal activation increases the water wettability of the formation rock in reservoir 105. In addition, the carbon-dioxide gas increases the pressure in the reservoir 105, which offers the potential to enhance mobilization of the hydrocarbons in reservoir 105. The ammonia, amine, and alkanolamine resulting from the thermal activation also increases the water wettability of the formation rock in reservoir 105. In addition, the ammonia, amine, and alkanolamine react with organic acid in the hydrocarbons to form surfactants in-situ, which offer the potential to emulsify the hydrocarbons, particularly viscous oil, to form oil-in-water emulsions, thereby reducing the oil viscosity and further increasing the mobilization of the hydrocarbons. Still further, as previously described, the carbon-dioxide gas, as well as the ammonia, amine, and alkanolamine gas, disperse in the aqueous solution to form gas-in-water foams in-situ, which are stabilized by the mixed-wet nanoparticles and any optional surfactant(s) included in the aqueous solution. The oil-in-water emulsions formed via surfactants (surfactants formed in-situ and/or optional surfactants in the aqueous solution) are also stabilized by the mixed-wet nanoparticles and any optional surfactant(s) included in the aqueous solution. Any optional surfactant(s) included in the aqueous solution can reduce the undesirable retention of nanoparticles on the surfaces of the surfaces of formation rock. The gas-in-water foams formed in-situ fill the water channels in the reservoir formed during the previous waterflooding operation.

After thermally activating the thermally activated chemical species, a waterflooding operation is performed (a cold or hot waterflooding operation). The water increases the pressure in reservoir, and as the water moves through the reservoir, it displaces hydrocarbons from the pore spaces. The hydrocarbon displacement is enhanced by the increase in the water wettability of the formation rock in the reservoir. In addition, the gas-in-water foams stabilized by the nanoparticles offer the potential to enhance production by filling water channels and forcing at least some of the injected water outside of the water channels, thereby effectively increasing the volume of the reservoir swept by the waterflooding operation. Still further, the oil-in-water emulsions stabilized by the nanoparticles in embodiments offer the potential to enhance production by decreasing the viscosity of the hydrocarbons in the reservoir.

Although methods 200, 300 shown in FIGS. 2 and 5, respectively, are described in the context of well system 10 including injection and production wells 120, 130 for producing hydrocarbons in subterranean reservoir 105, in general, embodiments of methods described herein (e.g., methods 200, 300) can be used in connection with other types of recovery techniques. For example, embodiments described herein can be used to separate, strip, and recover hydrocarbons from rock. In one embodiment, the rock including hydrocarbons are treated with an aqueous solution including one or more thermally activated chemical agents as previously described with respect to methods 200, 300. Next, the thermally activated chemical agents are activated by adding thermal energy to the treated rock to increase the temperature of the treated rock to or above the threshold temperature of the thermally activated chemical species in the aqueous solution. In embodiments where the thermally activated chemical species is urea, a urea derivative, or a carbamate, the carbon-dioxide gas resulting from the thermal activation increases the water wettability of the rock. The ammonia, amine, and alkanolamine resulting from the thermal activation also increase the water wettability of the rock. In addition, the ammonia, amine, and alkanolamine react with organic acid in the hydrocarbons to form surfactants in-situ, which offer the potential to emulsify the hydrocarbons, particularly viscous oil, to form oil-in-water emulsions, thereby reducing the oil viscosity and further increasing the mobilization of the hydrocarbons.

After thermally activating the thermally activated chemical species (e.g., urea), the treated rock is flushed or washed with cold water, which displaces hydrocarbons from the rock. The hydrocarbon displacement is enhanced by the increase in the water wettability of the treated rock resulting from the thermal activation of the thermally activated chemical species. In particular, the water leads to "beading" and "rolling up" of the hydrocarbons in the rock that are attached to rock surfaces. The resulting hydrocarbon droplets are more easily pushed or swept by the water from the rock, thereby separating and stripping the hydrocarbons from the rock.

In other embodiments, the rock including hydrocarbons are treated with an aqueous solution including one or more thermally activated chemical agents and nanoparticles (optionally with surfactant(s)) as described herein with respect to method 300. Next, the thermally activated chemical agents are activated by adding thermal energy to the treated rock to increase the temperature of the treated rock to or above the threshold temperature of the thermally activated chemical species in the aqueous solution. In embodiments where the thermally activated chemical species is urea, a urea derivative, or a carbamate, the carbon-dioxide gas resulting from the thermal activation increases the water wettability of the rock. The ammonia, amine, and alkanolamine resulting from the thermal activation also increase the water wettability of the rock. In addition, the ammonia, amine, and alkanolamine react with organic acid in the hydrocarbons to form surfactants in-situ, which offer the potential to emulsify the hydrocarbons, particularly viscous oil, to form oil-in-water emulsions, thereby reducing the oil viscosity and further increasing the mobilization of the hydrocarbons. In the same manner as previously described, the mixed-wet nanoparticles in the aqueous solution stabilize the gas-in-water foams, as well as the oil-in-water emulsions (i.e., hydrocarbons-in-aqueous solution emulsions) formed in the rock. In addition, any optional surfactant(s) included in the aqueous solution help stabilize the gas-in-water foams and the oil-in-water emulsions in the rock, as well as reduce the undesirable retention of nanoparticles on the surfaces of the surfaces of rock.

After thermally activating the thermally activated chemical species, the treated rock is flushed or washed with cold water, which displaces hydrocarbons from the rock. The hydrocarbon displacement is enhanced by the increase in the water wettability of the treated rock resulting from the thermal activation of the thermally activated chemical species. In particular, the water leads to "beading" and "rolling up" of the hydrocarbons in the rock that are attached to rock surfaces. The resulting hydrocarbon droplets are more easily pushed or swept by the water from the rock, thereby separating and stripping the hydrocarbons from the rock. In addition, the gas-in-water foams and oil-in-water emulsions stabilized by the nanoparticles offer the potential to enhance recovery of the hydrocarbons from the rock. In particular, the gas-in-water foams stabilized by the nanoparticles have viscosities greater than the viscosity of the water used to flush the and fill water channels in the rock. Consequently, the gas-in-water foams force at least some of the water outside of the water channels, thereby effectively increasing the volume of the rock swept by the water, which offers the potential for increased production. The oil-in-water emulsions stabilized by the nanoparticles decrease the viscosity of the hydrocarbons in the rock, thereby enhancing mobilization of the hydrocarbons when the rock are flushed with water. A soaking period can optionally be employed after thermally activating the chemical agent(s) before flushing/washing the rock with water to provide ample time for the reaction/decomposition products of the chemical agent(s) to interact with the hydrocarbons in the rock. In embodiments where a soaking period is employed, the soaking period is preferably between 1 and 30 days. In other embodiments, no soaking period is employed, and the rock is flushed/washed with water immediately after thermally activating the chemical agent(s).

To further illustrate various illustrative embodiments disclosed herein, the following examples are provided.

Example 1

Certain thermally activated chemical species, as described above, in aqueous solution undergo a hydrolysis reaction upon heating (i.e., thermal activation) and produce gas(es) and/or liquid(s). The production of gas(es) upon thermal activation of such thermally activated chemical species loaded into the formation increase the pressure within the formation and enhance the mobilization of hydrocarbons in the formation. Urea is one exemplary thermally activated chemical species that undergoes hydrolysis in aqueous solution upon thermal activation to produce carbon-dioxide and ammonia. The carbon-dioxide and ammonia exist in equilibrium between the gas and liquid phases. Experiments were conducted to analyze the thermal activation of urea and the associated hydrolysis. Each experiment was carried out in a stainless steel reactor vessel having a total cell volume of ~400 cm$^3$. A Teflon® liner was installed in the vessel to avoid any reactions between stainless steel wall and aqueous solution comprising urea. A series of pressure transducers were set up for measuring the pressure within the reactor vessel during each experiment. To achieve a stable temperature, the reactor vessel was placed in an oven.

For each experiment, a sample of approximately 60 cm$^3$ of an aqueous solution comprising urea at predetermined concentration (5 wt % urea, 10 wt % urea, 15 wt % urea, and 20 wt % urea) was weighed (i.e., the weight of the 60 cm$^3$ of aqueous solution comprising the urea was determined) and fed into the reactor vessel. The air in the reactor vessel was replaced with nitrogen ($N_2$) gas at 10 psig. The oven temperature was then gradually increased to a specific, predetermined target temperature (50° C., 80° C., 100° C., and 150° C.), and then kept at the target temperature for an extended period of time until little to no pressure increase within the reactor vessel was observed (i.e., approaching the equilibrium pressure). Next, the reactor was allowed to cool to ambient temperature, and then the concentration of urea, dissolved carbon-dioxide ($CO_2$) and ammonia ($NH_3$) in the water, and carbon-dioxide ($CO_2$) in the gas phase were determined.

As a baseline for comparison purposes, and to investigate whether any hydrolysis of urea occurred at 10° C., bottles of aqueous solutions of urea at predetermined concentrations (10 wt % urea) were kept at 10° C. in a refrigerator for 8 months, and then the concentrations of urea dissolved carbon-dioxide ($CO_2$) and ammonia ($NH_3$) in the water, and carbon-dioxide ($CO_2$) in the gas phase were determined.

Figure 6:
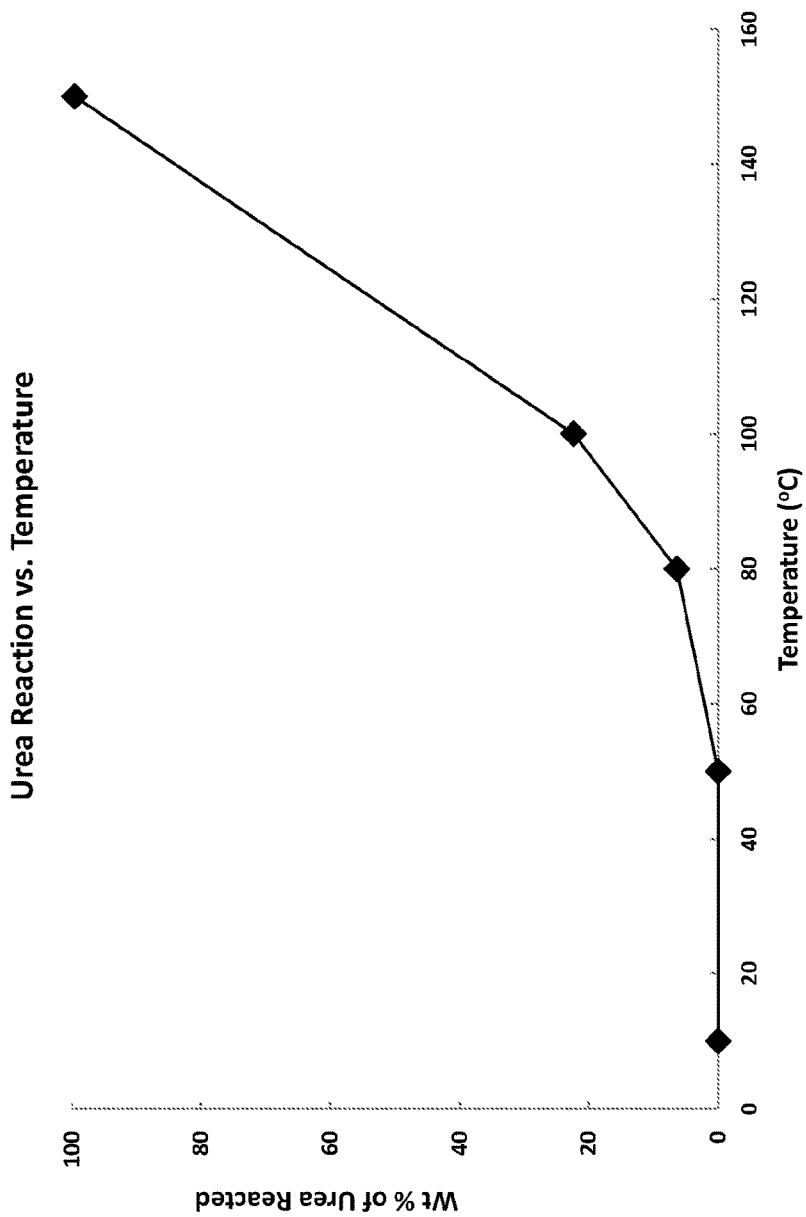
FIG. 6 is a graphical illustration of the amount of urea reacted versus temperature.

FIG. 6 illustrates the wt % of urea reacted as a function of temperature (at 10° C., 50° C., 100° C., and 150° C.) when samples of aqueous solutions, each comprising 10 wt % of urea were heated (to 50° C., 100° C., and 150° C.) in the reactor vessel in the manner previously described. The experimental results shown in FIG. 6 indicated that the hydrolysis of urea in aqueous solution strongly depends on the temperature, and further, that the hydrolysis of urea in aqueous solution can be thermally triggered when the aqueous solution is heated up to above approximately 50° C.

Table 1 below illustrates the measured equilibrium pressure within the reactor vessel and the wt % of urea reacted (via hydrolysis) when samples of aqueous solutions having different concentrations of urea (5 wt % urea, 10 wt % urea, 15 wt % urea, and 20 wt % urea) were heated to 150° C. in the manner as previously described. The experimental results shown in Table 2 indicated that the increase in pressure (the difference between the equilibrium/final pressure and the initial 10 psig pressure) due to reaction of urea (via hydrolysis) was strongly dependent on the urea concentration—the greater the urea concentration in the aqueous solution, the greater the increase in pressure. In addition, the experimental results shown in Table 1 indicated that all or substantially all of the urea in the aqueous solution was reacted (via hydrolysis).

TABLE 1

| Urea Concentration in Aqueous Solution Sample (wt %) | Pressure Increase (psi) | Wt % of Urea Reacted |
|---|---|---|
| 5 | 72.8 | 100.0 |
| 10 | 135.5 | 99.6 |
| 15 | 184.3 | 98.1 |
| 20 | 234.7 | 98.0 |

Table 2 below illustrates the wt % of urea reacted (via hydrolysis), the volumes of gas(es) produced by the reaction of urea, and the time allowed for the reaction when samples of aqueous solutions having different concentrations of urea (5 wt %, 10 wt %, 15 wt %, and 20 wt %) were heated (to 50° C., 80° C., 100° C., and 150° C.) in the manner previously described. The experimental results shown in Table 2 indicated that urea is very stable in aqueous solution at ambient temperatures, and further, that the hydrolysis of urea in aqueous solution does not occur until the aqueous solution is heated to a certain temperature. For instance, the sample of aqueous solution including urea at a concentration of 10 wt % was heated to 50° C. for several days and no gas was produced. The sample of aqueous solution including urea at a concentration of 10 wt % maintained at 10° C. for 8 months exhibited no reactions of urea (i.e., no reduction in urea concentration was found).

TABLE 2

| Urea Concentration in Aqueous Solution Sample (wt %) | Temperature (° C.) | Wt % Urea Reacted | Volume of Produced Gas at Standard Conditions[4] (cm³) | Time Allowed for Reaction[5] |
|---|---|---|---|---|
| 10 | 10 | 0 | 0 | 8 months |
| 10 | 50 | 0 | 0 | 70 hours |
| 10 | 80 | 6 | 104 | 18 days |
| 5 | 100 | 14 | 120 | 120 hours |
| 10 | 100 | 22 | 363 | 158 hours |
| 5 | 150 | 100 | 864 | 30 hours |
| 10 | 150 | 100 | 1620 | 40 hours |
| 15 | 150 | 98 | 2208 | 36 hours |
| 20 | 150 | 98 | 2886 | 7.5 hours |

[4]"Standard Conditions" are 273 K and 1 bar (absolute).
[5]Experiments with urea wt % decompositions less than 100% were stopped arbitrarily on the grounds of time and were not necessarily indicative of equilibrium.

Example 2

Experiments were conducted to assess the effect of the treatment of synthetic oilsands with urea on oil recovery. In particular, synthetic oilsand samples having different amounts of original oil, referred to as original oil-in-place (OIP), were treated with steam. Select samples of synthetic oilsands having 10% original OIP were treated with a combination of steam and different concentrations of urea. One synthetic oilsand sample treated with steam having a 5 wt % urea concentration was flushed with cold water to simulate a cold waterflooding operation. The amount of oil recovered from each synthetic oilsand sample was measured.

Figure 7:
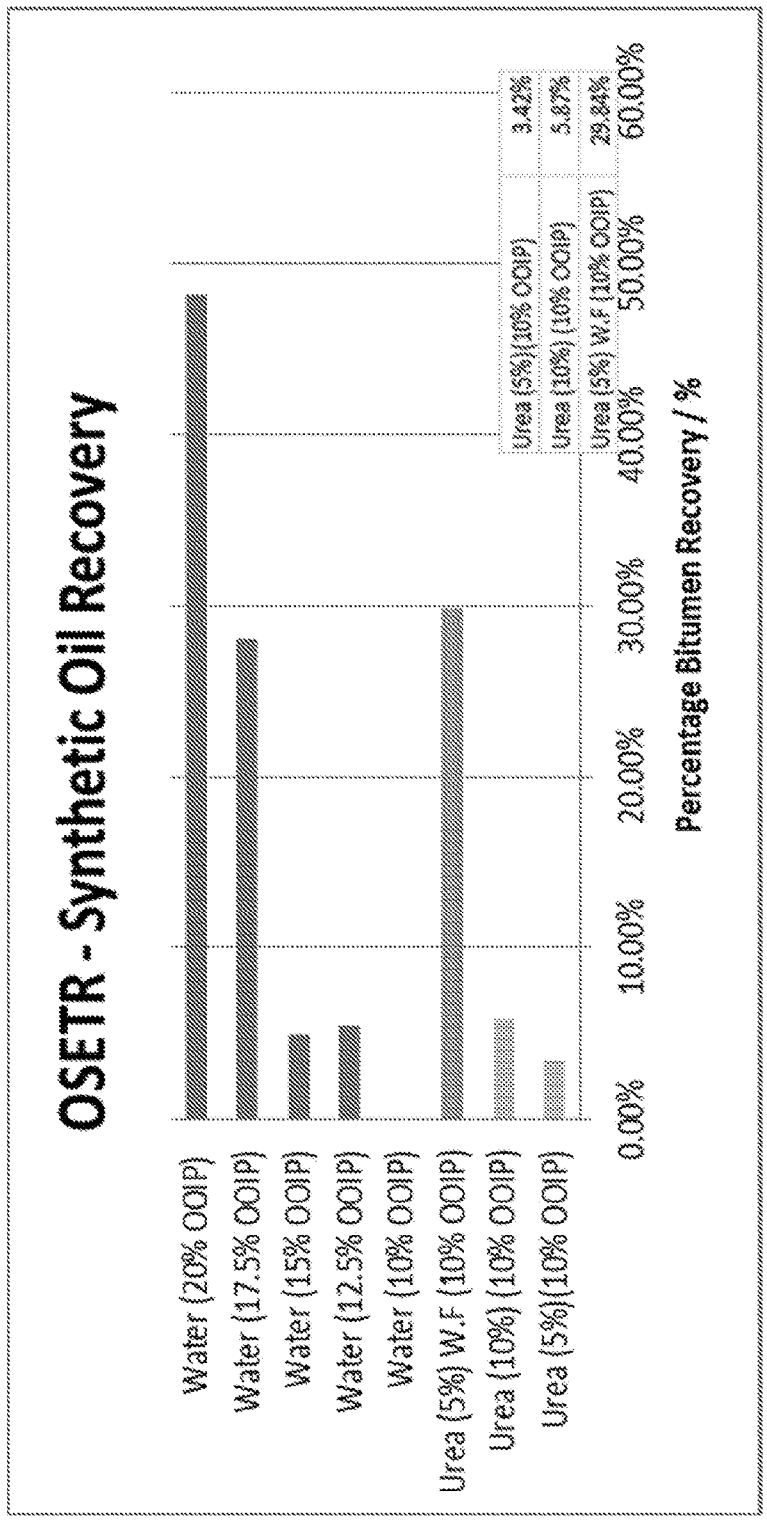
FIG. 7 is a graphical illustration of the percentage of original oil-in-place (OIP) recovered from synthetic oil sand samples treated with different steam comprising different concentrations of urea according to Example 2.
Figure 8:
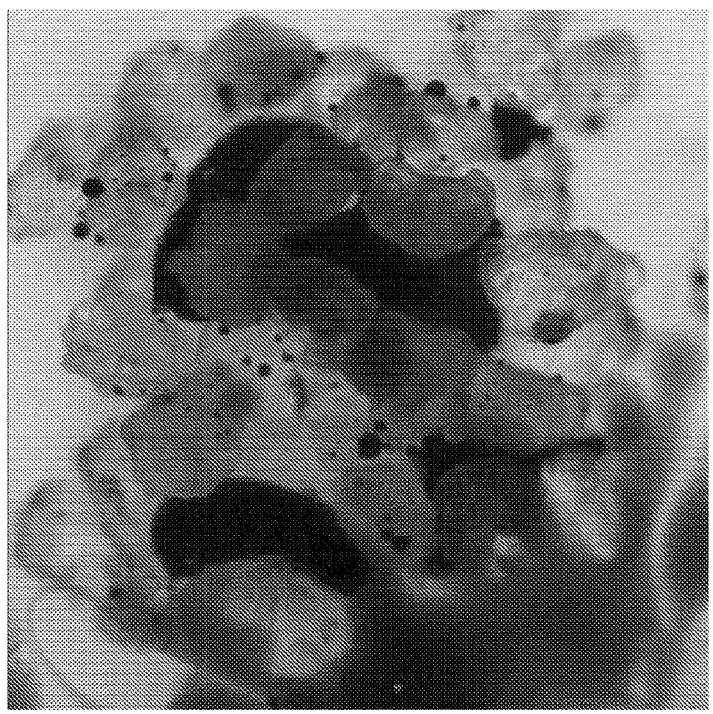
FIG. 8 is an image of one of the synthetic oil sand samples from Example 2 treated with steam comprising 5 wt % urea followed by the application of cold water.

FIG. 7 illustrates the percentage of oil recovered from each synthetic oilsand sample as a function of the original OIP and the steam composition. In general, the results indicate that the oil recovery by steam strongly depends on the original OIP. When the original OIP was 10%, the oil recovery from the synthetic oilsand sample treated with steam (without any urea) was essentially zero. However, when urea was added to the steam, the oil recovery from the synthetic oilsand sample with 10% original OIP increased with urea concentration. For example, a 10% original OIP synthetic oilsand sample treated with steam comprising 10 wt % urea increased the oil recovery to about 5%. Further, for the 10% original OIP synthetic oilsand sample that was treated with steam comprising 10 wt % urea and then flushed with cold water, the oil recovery increased significantly to about 30%. When the cold water was applied to that synthetic oilsand sample after treatment with steam comprising 10 wt % urea, the "roll-up" phenomenon was observed as shown in FIG. 8. The "roll-up" of the oil in this sample indicated the sand surface had become strongly water wet, thereby suggesting that the wettability change by the urea treatment might be a mechanism for the significantly improved oil recovery.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A method for producing hydrocarbons within a reservoir in a subterranean formation, the reservoir having an ambient temperature and an ambient pressure, the method comprising:
    (a) injecting an aqueous solution into the reservoir with the reservoir at the ambient temperature, wherein the aqueous solution comprises water, a thermally activated chemical species, and a plurality of nanoparticles, wherein the thermally activated chemical species is urea, a urea derivative, or a carbamate, wherein the thermally activated chemical agent is thermally activated at or above a threshold temperature less than 200° C., and wherein each nanoparticle has an outer surface that is partially water-wet and partially oil-wet;
    (b) thermally activating the thermally activated chemical species in the aqueous solution during or after (a) at a temperature equal to or greater than the threshold temperature to produce carbon-dioxide and at least one of ammonia, amine, and alkanolamine within the reservoir;
    (c) increasing a water wettability of the subterranean formation in response to the thermally activation in (b) with the carbon-dioxide, ammonia, amine, or alkanolamine;
    (d) increasing the pressure of the reservoir with the carbon-dioxide;
    (e) reacting the ammonia, amine, or alkanolamine with organic acids in the hydrocarbons to form surfactants in the reservoir, wherein the surfactants emulsify the hydrocarbons and form an oil-in-water emulsion in the reservoir; and
    (f) waterflooding the reservoir with water after (a), (b) (c), (d), and (e).

2. The method of claim 1, wherein the thermally activated chemical species is a urea derivative selected from the group comprising methyl urea, 1-ethyl urea, 1,1-dimethyl urea, 1,3-dimethyl urea, 1,1-diethyl urea, and bi(hydroymethyl) urea.

3. The method of claim 1, wherein the thermally activated chemical species is a carbamate selected from the group comprising ammonium carbamate, amine carbamate, and alkanolamine carbamate.

4. The method of claim 1, wherein the thermally activated chemical species is a carbamate having a solubility of at least 0.05 g/ml in aqueous solution.

5. The method of claim 1, wherein the thermally activated chemical species is a carbamate having the formula $R_1R_2NC(O)_2R_3$, where $R_1$, $R_2$, $R_3$ is each selected from a C1-C2 alkyl group, a C1-C2 alkanol group, a phenyl group, a benzyl group, hydroxyl, or hydrogen.

6. The method of claim 5, wherein the carbamate is ethyl carbamate or ethanolamine carbamate.

7. The method of claim 1, wherein (b) comprises injecting steam or hot liquid water into the reservoir to increase the temperature of the reservoir to a temperature that is equal to or greater than the threshold temperature.

8. The method of claim 1, wherein the threshold temperature is between 20° and 150° C.

9. The method of claim 1, wherein the threshold temperature is less than the ambient temperature of the reservoir, and wherein (b) comprises thermally activating the thermally activated chemical species at the ambient temperature of the reservoir.

10. The method of claim 9, wherein the ambient temperature of the reservoir is greater than 80° C.

11. The method of claim 1, wherein the aqueous solution is injected at an injection pressure during (a) that is less than a displacement pressure of the hydrocarbons in the reservoir.

12. The method of claim 1, wherein a majority of the total outer surface area of each nanoparticle is water-wet.

13. The method of claim 1, further comprising:
forming a gas-in-water foam in the reservoir with carbon dioxide gas;
stabilizing the oil-in-water emulsion in the reservoir with the nanoparticles; and
stabilizing the gas-in-water foam in the reservoir with the nanoparticles.

14. The method of claim 1, wherein each nanoparticle has a size or diameter between 1.0 nanometer and 1.0 micron; and
wherein the aqueous solution has a concentration of nanoparticles between 10 and 10,000 ppmw.

15. The method of claim 1, wherein each nanoparticle comprises an inorganic or polymeric material.

16. The method of claim 15, wherein the outer surface of each nanoparticle is partially coated with a coating.

17. The method of claim 1, wherein the aqueous solution further comprises one or more surfactants configured to reduce adhesion of the nanoparticles to surfaces of the subterranean formation.

18. The method of claim 1, further comprising repeating (a) to (f).

19. The method of claim 1, wherein (f) comprises performing a hot waterflooding operation by injecting water having a temperature greater than the ambient temperature of the reservoir into the reservoir or performing a cold waterflooding operation by injecting water having a temperature less than or equal to the ambient temperature of the reservoir into the reservoir.

20. The method of claim 1, further comprising waterflooding the reservoir before (a) to (f).

21. The method of claim 1, wherein the aqueous solution has a temperature less than or equal to 40° C. during (a).

22. The method of claim 1, wherein the thermally activated chemical species is urea.

23. The method of claim 22, wherein the aqueous solution has a temperature less than or equal to 40° C. during (a).

24. The method of claim 1, wherein the water for waterflooding the reservoir in (d) comprises a total dissolved solids (TDS) greater than 200 ppm and less than 5,000 ppm.

25. The method of claim 1, wherein the water for waterflooding the reservoir in (d) comprises a multivalent cation content less than 300 ppm.

26. The method of claim 1, wherein the water for waterflooding the reservoir in (d) comprises a polymer, a polymer pre-cursor, or a delayed action polymer.

27. The method of claim 1, further comprises:
(g) injecting gas into the reservoir after (f); and
(h) waterflooding the reservoir with water after (g).

28. A method for recovering hydrocarbons from hydrocarbon bearing rock in a hydrocarbon recovery operation, the method comprising:

(a) applying an aqueous solution to the rock, wherein the aqueous solution comprises water, a thermally activated chemical species, and a plurality of nanoparticles, wherein the thermally activated chemical species is urea, a urea derivative, or a carbamate, wherein the thermally activated chemical agent is thermally activated at or above a threshold temperature between 20° and 150° C. and wherein each nanoparticle has an outer surface that is partially water-wet and partially oil-wet;
(b) thermally activating the thermally activated chemical species in the aqueous solution during or after (a) at a temperature equal to or greater than the threshold temperature to produce carbon-dioxide and at least one of ammonia, amine, and alkanolamine within the rock;
(c) forming a gas-in-water foam in the rock with carbon dioxide gas;
(d) reacting the ammonia, amine, or alkanolamine with organic acids in the hydrocarbons to form surfactants in the rock; and
(e) emulsifying the hydrocarbons in the rock with the surfactants to form an oil-in-water emulsion;
(f) increasing a water wettability of the rock in response to the thermally activation in (b); and
(g) flushing the rock with water after (a), (b), (c), (d), (e), and (f).

29. The method of claim 28, wherein the thermally activated chemical species is a urea derivative comprising methyl urea, 1-ethyl urea, 1,1-dimethyl urea, 1,3-dimethyl urea, 1,1-diethyl urea, or bi(hydroymethyl) urea.

30. The method of claim 28, wherein the thermally activated chemical species is a carbamate selected from the group comprising ammonium carbamate, amine carbamate, and alkanolamine carbamate.

31. The method of claim 28, wherein the thermally activated chemical species is a carbamate having a solubility of at least 0.05 g/ml in aqueous solution.

32. The method of claim 28, wherein the thermally activated chemical species is a carbamate having the formula $R_1R_2NC(O)_2R_3$, where $R_1$, $R_2$, $R_3$ is each selected from a C1-C2 alkyl group, a C1-C2 alkanol group, a phenyl group, a benzyl group, hydroxyl, or hydrogen.

33. The method of claim 32, wherein the carbamate is ethyl carbamate or ethanolamine carbamate.

34. The method of claim 28, wherein (b) comprises applying thermal energy to the rock to increase the temperature of the rock to a temperature that is equal to or greater than the threshold temperature.

35. The method of claim 34, wherein (b) comprises applying steam or hot liquid to the rock.

36. The method of claim 28, further comprising:
stabilizing the oil-in-water emulsion in the rock with the nanoparticles; and
stabilizing the gas-in-water foam in the rock with the nanoparticles.

37. The method of claim 28, wherein each nanoparticle has a size or diameter between 1.0 and 100.0 nanometers; and
wherein the aqueous solution has a concentration of nanoparticles between 10 and 10,000 ppmw.

38. The method of claim 28, wherein the aqueous solution further comprises one or more surfactants configured to reduce adhesion of the nanoparticles to surfaces of the rock.

39. The method of claim 28, further comprising repeating (a) to (g).

* * * * *